(12) United States Patent
McMichael

(10) Patent No.: US 11,775,575 B2
(45) Date of Patent: Oct. 3, 2023

(54) SYSTEMS AND METHODS OF PERFORMING SEARCHES WITHIN A TEXT INPUT APPLICATION

(71) Applicant: William McMichael, New York, NY (US)

(72) Inventor: William McMichael, New York, NY (US)

(*) Notice: Subject to any disclaimer, the term of this patent is extended or adjusted under 35 U.S.C. 154(b) by 385 days.

(21) Appl. No.: 16/437,312

(22) Filed: Jun. 11, 2019

(65) Prior Publication Data

US 2020/0167380 A1 May 28, 2020

Related U.S. Application Data

(63) Continuation of application No. 15/399,386, filed on Jan. 5, 2017, now abandoned.

(60) Provisional application No. 62/418,273, filed on Nov. 6, 2016, provisional application No. 62/275,125, filed on Jan. 5, 2016.

(51) Int. Cl.
*G06F 16/48* (2019.01)
*G06F 16/435* (2019.01)
*H04L 51/046* (2022.01)
*G06F 3/0482* (2013.01)
*G06F 3/0488* (2022.01)
*G06F 3/04886* (2022.01)

(52) U.S. Cl.
CPC .......... *G06F 16/48* (2019.01); *G06F 16/435* (2019.01); *G06F 3/0482* (2013.01); *G06F 3/0488* (2013.01); *G06F 3/04886* (2013.01); *H04L 51/046* (2013.01)

(58) Field of Classification Search
CPC ........ G06F 16/48; G06F 16/435; G06F 9/451; G06F 3/0482; G06F 3/0488; G06F 3/04886; G06F 3/0486; H04M 1/72403; H04L 51/046
See application file for complete search history.

(56) References Cited

U.S. PATENT DOCUMENTS

| 6,301,626 | B1 * | 10/2001 | Knox | G06F 3/0238 400/89 |
| 7,590,699 | B2 * | 9/2009 | Natarajan | H04L 51/04 709/206 |
| 8,037,047 | B2 * | 10/2011 | Szeto | G06F 16/90344 707/706 |
| 8,296,380 | B1 | 10/2012 | Kelly et al. | |

(Continued)

*Primary Examiner* — Miranda Le
(74) *Attorney, Agent, or Firm* — WEBER ROSSELLI & CANNON LLP

(57) ABSTRACT

The present disclosure relates to systems, apparatuses, and methods for performing searches and displaying results within a messaging application. A computing apparatus, which may include a touch-sensitive display, displays a user interface which includes a messaging application interface and a compact search applet interface encompassing a portion of a messaging application interface. A search applet is executed within the memory allocated to the messaging application or parent application. The search applet accepts user input and displays a set of media elements based on a search query run on the user input. The search results are then displayed by the search applet interface, allowing the user to quickly review the search results and, if desired, integrate media content into a message of the messaging application.

18 Claims, 22 Drawing Sheets

(56) References Cited

U.S. PATENT DOCUMENTS

| | | |
|---|---|---|
| 8,332,762 B2 | 12/2012 | Lee |
| 8,849,931 B2 | 9/2014 | Linner et al. |
| 9,030,521 B2 | 5/2015 | Rossano et al. |
| 9,052,792 B2 | 6/2015 | Chavan |
| 9,185,062 B1 | 11/2015 | Yang et al. |
| 9,203,947 B2 | 12/2015 | Kim et al. |
| 9,207,835 B1 | 12/2015 | Yang et al. |
| 9,246,967 B2 | 1/2016 | Garmark et al. |
| 9,639,861 B2 | 5/2017 | DeMattei |
| 2004/0086095 A1 | 5/2004 | Dixit et al. |
| 2009/0012940 A1* | 1/2009 | Ives ................... G06F 16/9535 |
| 2009/0111487 A1 | 4/2009 | Scheibe |
| 2009/0172565 A1 | 7/2009 | Jackson et al. |
| 2010/0279720 A1 | 11/2010 | Schultz et al. |
| 2011/0138300 A1 | 6/2011 | Kim et al. |
| 2012/0102433 A1* | 4/2012 | Falkenburg ......... G06F 9/45529 |
| | | 715/835 |
| 2013/0147933 A1 | 6/2013 | Kulas |
| 2014/0136990 A1 | 5/2014 | Gonnen et al. |
| 2015/0121248 A1 | 4/2015 | Levin et al. |
| 2015/0312180 A1 | 10/2015 | Taler |
| 2015/0326708 A1 | 11/2015 | Ginzburg |
| 2016/0006856 A1* | 1/2016 | Bruno ............... H04M 1/72436 |
| | | 715/809 |
| 2016/0014059 A1 | 1/2016 | Rathod |
| 2016/0180560 A1* | 6/2016 | Patel ................... G06F 3/04886 |
| | | 345/636 |
| 2017/0024087 A1 | 1/2017 | Pathy et al. |
| 2017/0083519 A1 | 3/2017 | Huang et al. |

\* cited by examiner

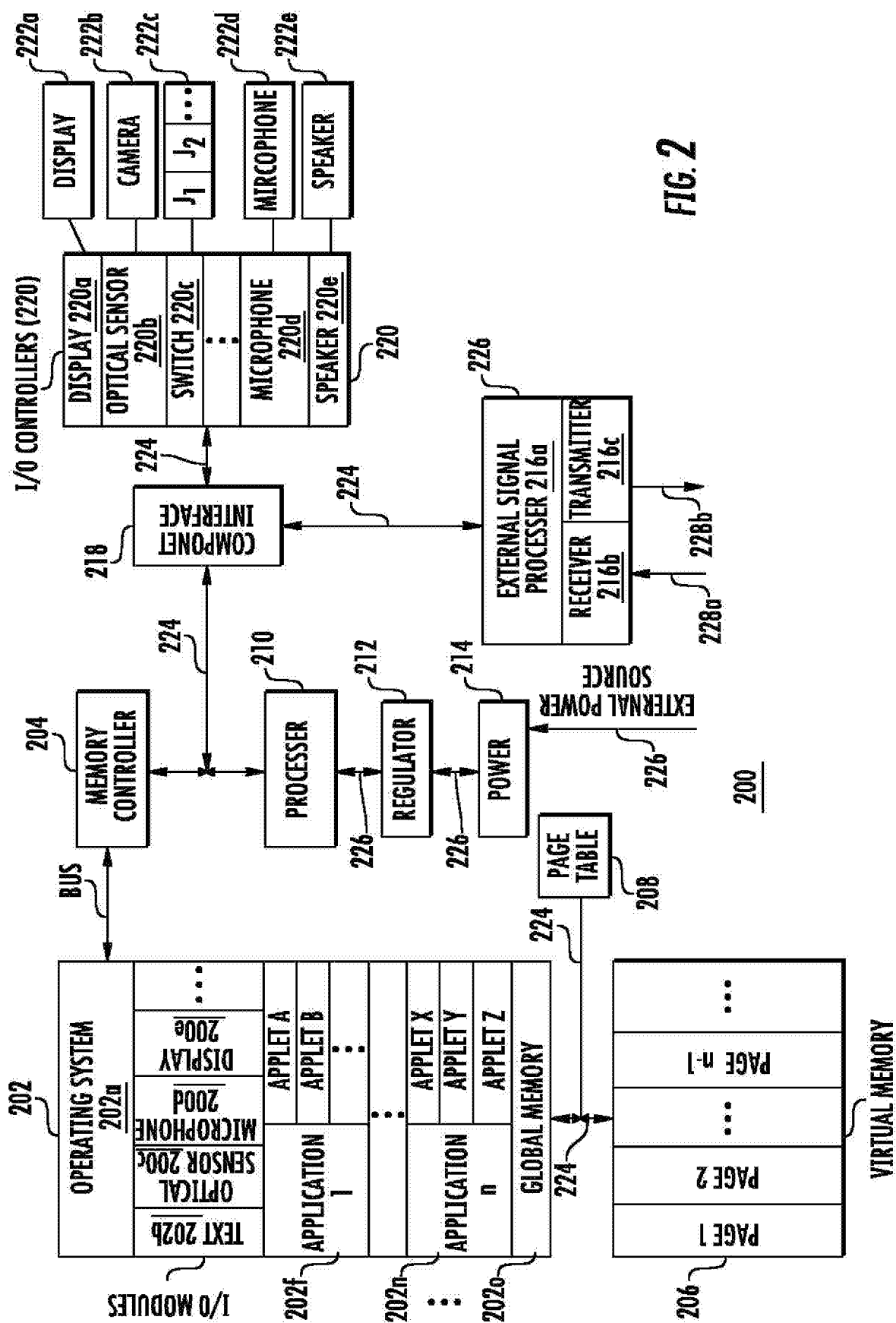

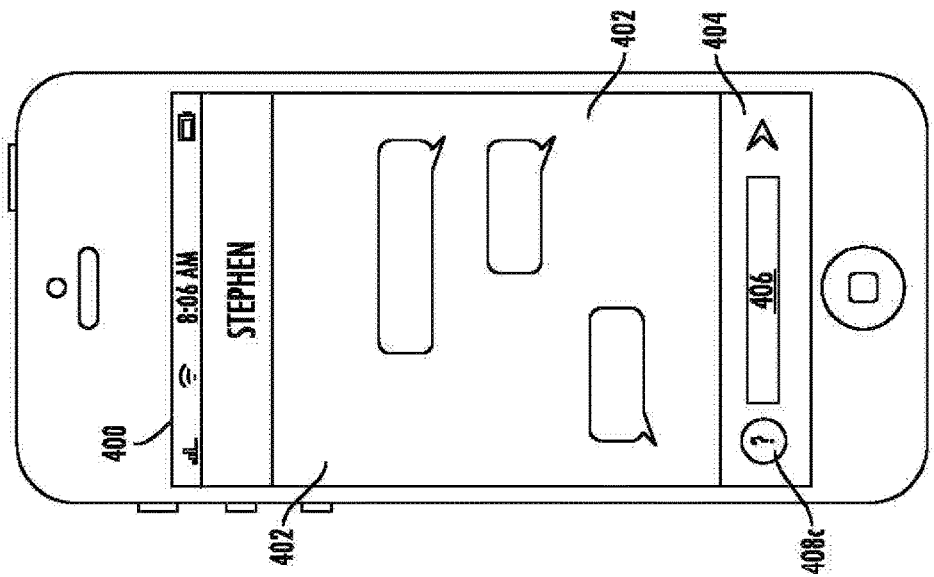
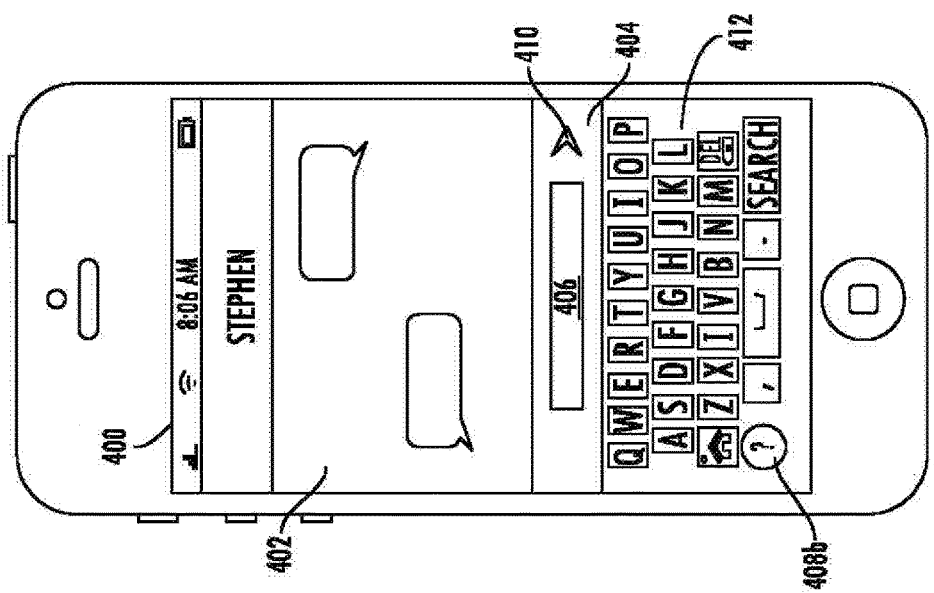
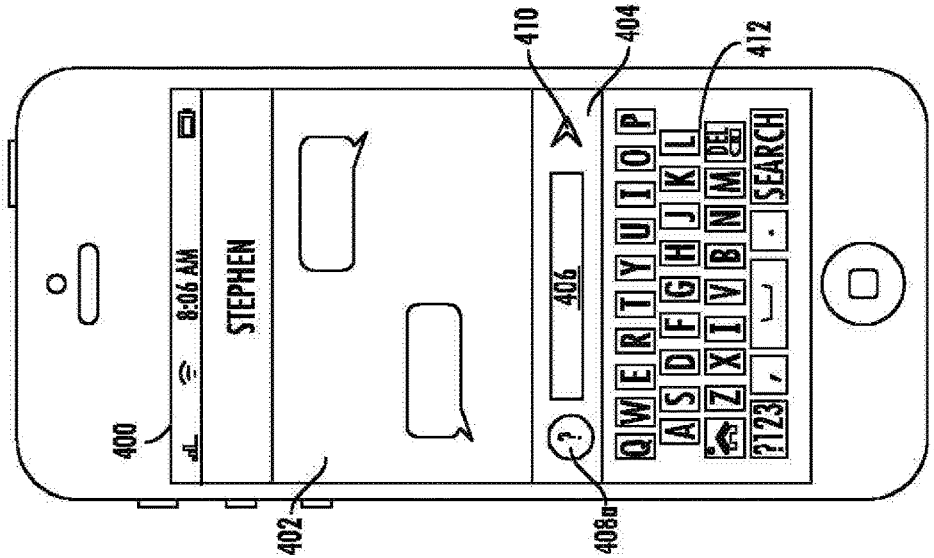

SYSTEMS AND METHODS OF PERFORMING SEARCHES WITHIN A TEXT INPUT APPLICATION

CROSS-REFERENCE TO RELATED APPLICATIONS

The present application claims priority to U.S. patent application Ser. No. 15/399,386, filed on Jan. 5, 2017, which claims the benefit of and priority to U.S. Provisional Patent Application No. 62/418,273, filed on Nov. 6, 2016, and U.S. Provisional Patent Application No. 62/275,125, filed on Jan. 5, 2016. The entire contents of each of the foregoing applications are hereby incorporated by reference herein.

TECHNICAL FIELD

The present disclosure relates to performing searches within a text input application; more particularly, the present disclosure relates to systems and methods by which computing apparatuses accept, execute, and display search queries and results from within computing environments associated with a virtualized keyboard of a messaging application.

BACKGROUND

Messaging applications have been developed to meet consumer demand for expedited communication. For example, individuals use messaging applications to arrange to meet at particular locations, to confirm that certain deadlines are being met, or to verify information, which ordinarily require in-person communication. Also, different methods of searching and aggregating relevant data have also been developed to address the need for more vast and comprehensive information. Such methods include the development of mobile internet browsers capable of returning results in compact form as well as stand-alone applications which perform searches and configure the response to optimize receipt and analysis by the querying user.

SUMMARY

In addition to loading and executing multiple applications to obtain relevant or necessary information relating to messaging correspondence, users may also wish to perform comprehensive searches within messaging applications. The systems, apparatuses, and methods of the present disclosure allow users to perform comprehensive content searches such as searches of Internet content within messaging applications. In at least some embodiments, messaging applications are prompted to run compact applications otherwise referred to as applets. These applets are executed by a messaging application. The applets are designed to display a compact search interface within the keyboard region of a messaging application. The compact search interface may take advantage of existing systems such as keyboard input functionality employed by the communication apparatus or messaging application, as well as audio or visual input accepted by the communication apparatus.

In one aspect, the present disclosure features a method of displaying data within a keyboard region of a display of a communication apparatus. The method includes displaying, on the display, a messaging screen of a messaging application, detecting a request to execute a keyboard applet within the messaging application, and, in response to detecting the request to execute the keyboard applet, displaying a keyboard screen on the display of the communication apparatus. The method further includes displaying a search applet button, detecting selection of the search applet button, and, in response to detecting selection of the search applet button, executing a search applet, which displays a search input field configured to receive search input data. The method further includes receiving search input data entered into the search input field, performing a search of a server based on the search input data, receiving media content based on the results of the search of the server, and displaying, on the display of the communication apparatus, the media content within at least a portion of the keyboard region of the display.

In another aspect, the present disclosure features a communication apparatus. The communication apparatus includes a display; a processor coupled to the display; and a memory coupled to the processor. The memory stores instructions, which, when executed by the processor, cause the processor to: display, on the display, a messaging screen of a messaging application, the messaging application configured to transmit and receive messages; detect a request to execute a keyboard applet within the messaging application, the keyboard applet configured to receive keyboard input from the display; display the keyboard applet on the display in response to detecting the request to execute the keyboard applet, the keyboard applet including a search applet button; detect selection of the search applet button; receive search input data; perform a search of a server based on the search input data; generate media content based on the search input data; and display, on the display, the media content within the keyboard applet.

BRIEF DESCRIPTION OF THE DRAWINGS

FIG. 2 is a block diagram illustrating a communication apparatus with various input and output components in accordance with some embodiments of the present disclosure.

FIGS. 5A-5C illustrate exemplary embodiments of a messaging applet search interface.

Figure 1A:
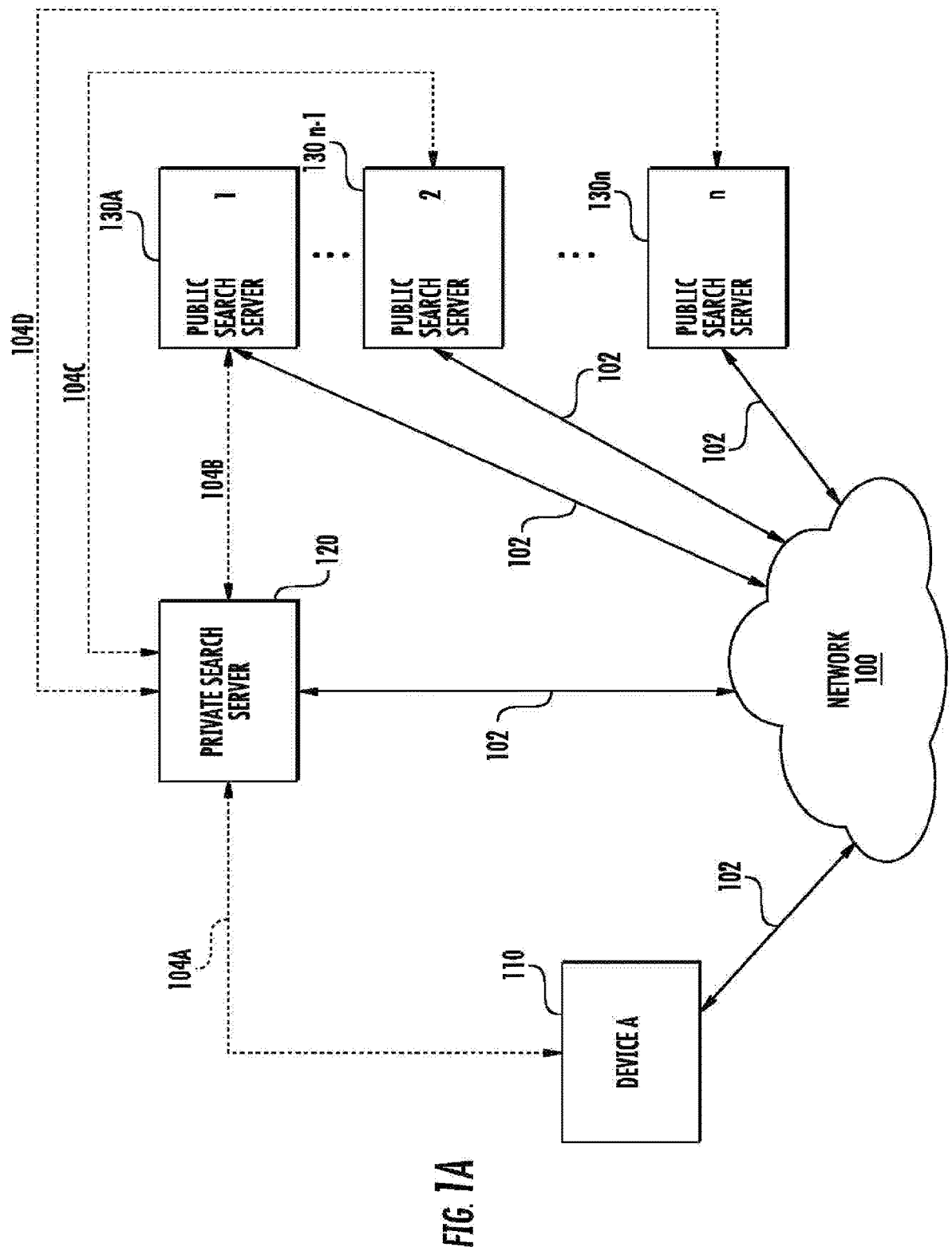
FIG. 1A is a block diagram of a network that transmits user queries through a private search server, which in turn queries public search servers and returns search results for display on a messaging screen according to embodiments of the present disclosure.

While the invention is amenable to various modifications and alternative forms, specific embodiments have been shown by way of example in the drawings and are described in detail below. The intention is not to limit the scope of the subject matter covered in the drawings, rather, it is to facilitate understanding of the embodiments described. The invention is intended to cover all modifications, equivalents, and alternatives failing within the scope of the invention as defined by the appended claims.

DETAILED DESCRIPTION

An example of person-to-person communication is a messaging communication between two separate personal computing communication apparatuses. Personal communication by text message typically requires execution of multiple communication apparatus applications should one user find it necessary to perform a search to identify or verify information relating to the message to be transferred. Execution of these applications generally requires that a user open a second application on a communication apparatus and perform a search, then return to the messaging application to integrate the search content into the message. These applications often require that the messaging application be placed into the background on the communication apparatus while the search application, often a web browser or stand-alone search application, performs a search on the user's search query.

The present disclosure features technology for integrating search functionality into person-to-person communication via a messaging application. In embodiments, the technology of the present disclosure performs an inline search, or compact search, within a messaging application. The inline search allows a user to remain within the messaging application, reducing both the demand on communication apparatus resources to perform the search as well as the time added to the overall performance of a search by the user. The inline search can be performed within a keyboard region of a display. The keyboard region is used both for inputting a query and displaying search results. The inline search can be performed either on a generic search platform, or can be performed on a specific search platform such as Google®, Bing®, The Weather Channel®, Yelp®, and so on.

Further, the inline search may be configured to display search results based on predetermined search queries. For example, when a user selects a search database such as The Weather Channel®, the inline search applet may automatically retrieve communication apparatus location information from hardware components of the communication apparatus, and transmit that communication apparatus location information to a private search server, or to The Weather Channel® search server directly. Upon receipt of the communication apparatus location data, the search server can send information which has been predetermined to be responsive to the user's inquiry. Where local weather information is not desired by the user, the search applet may accept text-based search input and execute a second search, returning relevant results.

In some instances, selection and transmission of specific search queries may result in compact search applications being returned to the communication apparatus (referred to herein as "search result applets"). In response to receiving search query information from a communication apparatus, a private search server or third-party search server may return a search result applet, which contains applet information to be executed, or may return search result information to be displayed within a search result applet running on the communication apparatus.

Consider the following example of a query in which a search applet's display is described for illustrative purposes. In accordance with various embodiments, in response to a user's query, a computing apparatus executes a messaging application, which in turn executes a keyboard applet that accepts input on the communication apparatus's touch-sensitive display.

Once the user begins to compose the message by inputting text into the messaging input field of the messaging application, the user may then determine that more information is needed to complete the message and that a search must be performed to complete the message. Upon determining that more information is needed, the user then selects a search applet button, which causes an inline search applet to be executed on the communication apparatus.

In response to execution of the inline search applet, a user interface is displayed within a subset or region of the communication apparatus's display, in which the applet displays an input field for inputting a query to the applet. Upon receipt of a query, the applet transmits the query to a private search server or public search server such as the Google® search engine or Bing® search engine.

The search applet receives query results from the search servers and organizes the query result data as a set of media elements to be displayed. The media elements are ordered in a predetermined order and displayed within the search applet region of the communication apparatus's display screen.

Upon review of the results displayed in the search applet, the user then selects the message input field, and the search applet display is replaced with the original keyboard applet. The user then integrates the information from the displayed search media elements into the message and transmits the message. During this process, the messaging applet remains on the display, the user does not have to switch to another application, and the communication apparatus does not have to load an entire application into memory for execution of the search query.

In other embodiments, the search applet of the present disclosure transmits a location query for a category of businesses to Google Maps® or Bing Maps®. The location query can include text input data related to the business being searched for, location data, time data, system data retrieved from the communication device, or any combination thereof. Upon receipt of the query, Google Maps® or Bing Maps®, for example, searches servers and identifies the location data associated with the query. Such location data may include a list of businesses related to the location query that are determined to be within a certain range of the communication apparatus. After identifying the location data, Google Maps® then returns a search result applet, which includes an executable application configured to display an interactive map and locations marked on the map associated with the query. Upon selection of the marked locations, the search result applet displays relevant location data, including, for example, business hours and contact information.

In other embodiments, when the user initially selects the search applet button, a list of search databases which may be queried is displayed. Once the search applet determines a target database based on user input, the search applet executes a default query. Upon receipt of the default query results, the search applet displays the results prior to user input of a specific query.

The technology of the present disclosure can be used for performing inline searches within applications that require user input via a keyboard applet. The technology can be embodied as circuitry, programmable circuitry configured to execute applications such as software, communication apparatus applications, or as a combined system of both circuitry and software configured to be executed on programmable circuitry. Embodiments may include a machine-readable medium storing a set of instructions which cause at least one processor to perform the described methods. Machine readable medium is generally defined as any storage medium which can be accessed by a machine to retrieve content or data. Examples of machine readable media include but are not limited to magneto-optical discs, read only memory (ROM), random access memory (RAM), erasable programmable read only memories (EPROMs), electronically erasable programmable read only memories (EEPROMs), solid state communication apparatuses (SSDs) or any other machine-readable device which is suitable for storing instructions to be executed by a machine such as a computer.

The terms "connected" or "in communication with" and related terms are used in an operational sense and are not to be limited to a direct physical connection. For example, two communication apparatuses may be coupled together via a wireless network or via a physical connection. Based on the disclosure provided herein, a person of ordinary skill in the art will appreciate a variety of ways in which communication apparatuses can be connected or in communication with one another.

The phrase "in embodiments" and variations on this phrase generally is understood to mean that the particular feature, structure, system, or method being described includes at least one iteration of the disclosed technology. Such phrase should not be read or interpreted to mean that the particular feature, structure, system, or method described is either the best or the only way in which the embodiment can be implemented. Rather, such a phrase should be read to mean an exemplary way in which the described technology could be implemented, but need not be the only way to do so.

Where the terms "may," "could," or other similar permissive terms are used, the elements or features following or preceding the permissive term are optional components, features, or steps which need not be included in the overall system or method being described.

The term "component" refers broadly to general or specific purpose hardware or combinations of specific purpose hardware which, when combined, achieve a desired functional result.

The term "server" is meant to refer to a computing communication apparatus which is configured to translate and store large quantities of data from multiple communication apparatuses. A server can also be configured to perform certain computing functions which may be described as explicitly occurring on a computing apparatus or a personal computing communication apparatus. Generally, the term "server" is used to describe a computing apparatus or device which provides a variety of computing services, and the term "database" is used to describe a computing apparatus or device which stores and recalls information. In embodiments, the server may include a database.

FIG. 1A is a block diagram of a network 100 configured to transmit user queries to a private search server 120, which, in turn, queries public search servers 130*a*-130*n* and returns results for display on a messaging screen. Network 100 can include any combination of local area networks (LANs), wide area networks (WANs), wireless local area networks (WLANs), Metropolitan Area Networks (MANs), wireless networks, secured networks such as virtual private networks (VPNs), or any other suitable interconnected communication system in which data packets are transferred between two or more communication apparatuses via data connections 102. In embodiments, network 100 uses standard communications technologies and/or protocols to establish data connections 102 in order to facilitate the transfer of data packets among a plurality of independent communication apparatuses.

Network 100 may be capable of communicating using a variety of data formats for increased interoperability between communication apparatuses across a variety of data connections 102. The communication technologies used to facilitate communications between communication apparatuses of the present disclosure may include Ethernet, 802.11 (a/b/g/n/ac), 3G, 4G, CDMA, digital subscriber line (DSL), and the like, and permit the communication between a variety of communication apparatuses, which may be configured to transmit and receive data using a variety of protocols. Further, the communication technologies may implement certain protocols to facilitate the transfer of data across network 100 such as transmission control protocol/internet protocol (TCP/IP) or hypertext transport protocol (HTTP), simple mail transfer protocol (SMTP), and file transfer protocol (FTP), which allow for more uniform and efficient transfer of data between various communication apparatuses in the network 100.

Connections facilitated by the network 100 between Device A 110 and private search server 120, or between public search servers 130*a*-130*n* and private search server 120 may be referred to as functional connections 104*a*-104*n*. These functional connections 104*a*-104*n* describe data transmission pathways. As an example, data transmitted between communication apparatuses or between device A 110 and private search server 120 is, according to embodiments, routed through a network 100, which may include a series of intermediate communication apparatuses which translate the data. The transmission of this data is simplified and described as a functional connection 104a.

Private search server 120 may be any computing apparatus configured to receive, transmit, store, and analyze data. For example, private search server 120 may be configured to receive and analyze search queries and transmit query responses. In some embodiments, the private search server 120 is configured to accept text input from a querying communication apparatus 110 and transmit the query to a variety of public search servers 130a-130n for analysis. The query 112 is received via functional connection 104a and is transmitted through multiple functional connections 104b-104n. The private search server 120 may be calibrated to optimize data transfer through functional connections 104a-104n. Also, the private search server 120 may be configured to execute queries on the public search servers 130a-130n as well as store query results from prior queries.

In another embodiment, a private search server 120 may be configured to obtain multiple search or query results from multiple public search servers 130a-130n. The private search server 120 may be configured to organize the query results in a predetermined order and, if needed, truncate the query results prior to transmitting them to the querying communication apparatus 110.

The public search servers 130a-130n may be any type of computing apparatuses configured to receive queries, analyze the queries, and return query results. In some embodiments, one or more of the public search servers 130a-130n are connected via functional connections 104b-104n to a private search server and return query results based on the initial input received from communication apparatus or device A 110. Examples of private parties who host public search servers 130a-130n include the Google® Search Engine, Bing®, Yahoo®, as well as search servers which aggregate query data from among a plurality of search servers such as Dogpile®.

Communication apparatus A 110 may be an electronic communication apparatus which is capable of executing computing functions. Examples of these electronic communication apparatuses including mobile phones, desktop computers, thin client computing communication devices, laptop computers, virtualized computers, cluster or cloud computing environments, apparatuses incorporating application specific integrated circuits, or apparatuses incorporating field programmable gate arrays.

The data connections 102 may include a variety of connection techniques such as interconnection of digital communication apparatuses via wireless communication on the 802.11 standard (a/b/g/n/ac) (WiFi), Ethernet, 3G, 4G, CDMA, digital subscriber line (DSL), and the like. Further, data transmission over the data connections 102 may be implemented with TCIP/IP, HTTP, secure hypertext transfer protocol (HTTPS), SMTP, or FTP.

Figure 1B:
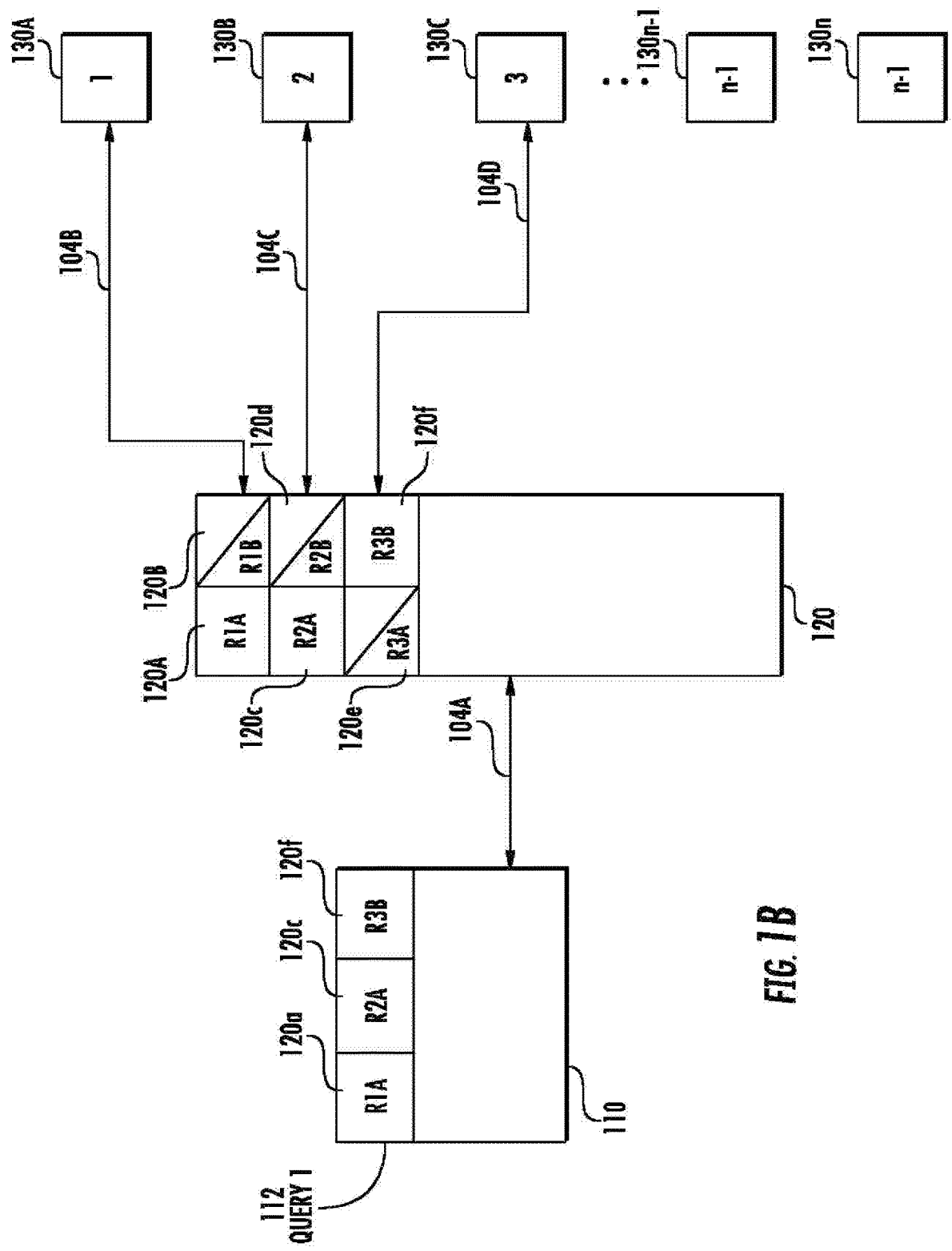
FIG. 1B is a block diagram of the private search server of FIG. 1A, which aggregates search results and returns them to a querying communication apparatus.

FIG. 1B is a block diagram illustrating data transmission via functional connections 104a-104n. In some embodiments, after submitting a query 112 to a private search server 120, the query 112 is sent to multiple public search servers 130a-130n. One or more servers may be selected from the public search servers 130a-130n to return results which may be relevant to the query 112. The private search server 120 receives the query results from the public search servers 130a-130c and, in some embodiments, temporarily stores the query results 120a-120f on the private search server 120. The private search server 120 then discards the query results 120b, 120d, 120e which are determined to be less responsive or relevant to the query than query results 120a, 120c, 120f. The private search server 120 may then transmit the query results, e.g., the more relevant query results 120a, 120c, 120f, to the querying communication apparatus 110 to be displayed by the search applet running on the querying communication apparatus 110.

FIG. 2 illustrates a communication apparatus 200 which may be entirely or partially included within computing apparatus 110 or servers 120, 130a-130n according to some embodiments. As illustrated in FIG. 2, communication apparatus 200 includes memory 202, a memory controller 204, non-volatile memory 206, input/output (I/O) component controllers 220a-220e, transceiver 216, and communication apparatus components 222a-222e.

Other embodiments of the disclosed technology may include all or a portion of the components and features illustrated in FIG. 2 along with additional or different modules, applications, components, and/or features. Some embodiments may incorporate two or more of the components or features into a single module or component.

Alternatively, some embodiments may implement the functionality of the disclosed embodiments in different manners, such as by combining, reorganizing, or substituting components or modules. For example, in one embodiment, communication apparatus A 110, which initiates a query 112, includes at least the components of communication apparatus 200, as illustrated in FIG. 2. In another embodiment, private search server 120 or public search servers 130a-130n may include the components and features of communication apparatus 200 except for optical sensors 222b, I/O buttons 222c, microphones 222d, and speakers 222e. Further, a display 222a may not be needed as the private search server 120 or public search servers 130a-130n can perform their functions without outputting results to a connected display. In some embodiments, communication apparatus A 120 may implement wireless connection techniques while private search server 120 or public search servers 130a-130n may implement wired connection techniques.

In some embodiments, a portion of the components and features of the communication apparatus 200 may be configured in such a way that they are simulated in virtualized environments, such as Microsoft®'s Azure® environment, Amazon®'s Web Services® (AWS®) or Google®'s Cloud Platform Service™.

Memory 202 may be any device, physical structure, and/or populated data structure which functions as a media storage device. In some embodiments, memory 202 may be computer memory which is volatile or non-volatile, e.g., computer memory which does not maintain its state when an electric current is no longer supplied to the computer memory. Memory 202 may be replaced with non-volatile memory, dynamic memory, or redundant memory. Memory 202 may include, for example, random access memory (RAM), memory storage devices, optical memory devices, medial magnetic media, floppy disks, magnetic tapes, disc hard drives, solid state hard drives, SDRAM, DDR RAM, erasable programmable read-only memories (EEPROMs), compact discs, DVDs, or any combination thereof. In accordance with some embodiments, memory 202 may be contained within one contiguous region of a physical device, may span across multiple regions on a physical device, or may span multiple memory devices such as virtual memory allocated within non-volatile memory 206.

Operating system 202a may provide a device environment which permits the initialization, execution, storage, and termination of one or more applications 202f-202n. Operating system 202a may be generally stored in non-volatile memory 206 and is initialized when power 214 is applied to the communication apparatus 200 via a regulator 212. The operating system 202a, once initialized, controls the initialization and execution of applications 202f-202n, and allocation of resources to applications such as an initial address space within memory 202, cycles to execute functions on the processor 210, and access pages 206a-206n stored in non-volatile memory 206.

Page tables 208 may accurately map the data locations stored within regions of the memory 202, sometimes referred to as pages, to the page location when stored in non-volatile memory 206a-206n. In some embodiments, page tables 208 are implemented to accurately store and retrieve data, swapping information between volatile memory and non-volatile memory regions within communication apparatus 200. Page tables 208 facilitate the transfer of pages 206a-206n from volatile memory, which, in turn, allow for the storage of application-specific data for use after the application has terminated or has been forced to stop.

Non-volatile memory may be any type of memory device which permits the extended storage of media. In some embodiments, non-volatile memory can be a solid state hard drive (SSD), disk drive, tape drive, compact disc, or virtual memory which is stored remotely. One skilled in the art will appreciate additional memory devices, storage techniques, and device configurations which can simulate or act as functional equivalents to the memory devices.

Communication apparatus applications, and in particular public and private messaging applications, are stored in memory 202 and retrieved for later execution on communication apparatus 200. In embodiments, processor 210 executes various applications and sub-applications or "applets" which include instruction sets stored in memory 202. In some embodiments, processors similar to processor 210 may be included in certain communication apparatus components such as I/O components. For example, one skilled in the art will appreciate that a communication apparatus display 220a may include a graphic processor (not shown) for executing certain graphical functions separate from the application's execution on the processor 210 of the communication apparatus 200.

Component controller 220 handles the I/O data collected from device components 222a-222e, such as cameras 222b, device displays 222a, device buttons 222c, microphones 222d, and speakers 222e. Device displays 222a can be either traditional displays or touch-sensitive displays. In some embodiments, where a touch-sensitive display 222a is implemented, the device controller 220 controls both the output of display information to either a display processor (not shown) or directly to the display 222a, as well as the input from the touch sensitive display 222a simultaneously, and transmits the input data in relation to the output data to a display module 202e for use by applications executed by the processor 210.

Component interface 250 may be any processor which implements a routing system between a variety of subcomponents and controllers. In some embodiments, component interface 250 routes signals accepted from both an I/O controller 220 and a transceiver 216, which handles the transmission and reception of wireless signals.

Figure 3:
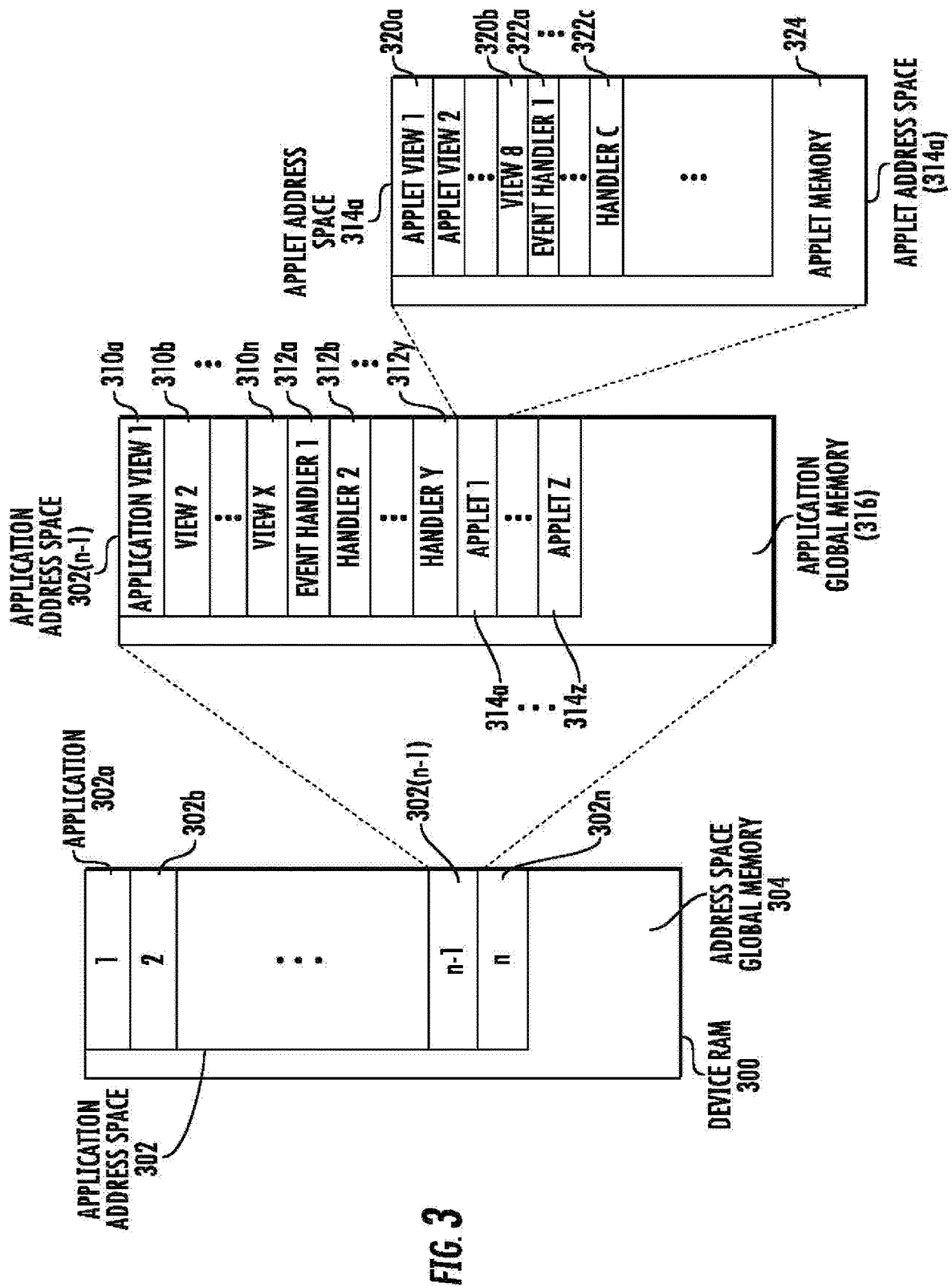
FIG. 3 is a block diagram of communication apparatus memory space illustrating the partitioning of memory for a compact application to be executed within a parent application.

FIG. 3 illustrates an embodiment of a region 302 as allocated by an operating system 202a to applications upon startup or during runtime. Upon request for an application's initialization, an application region 302a-302n is allocated within memory 202 for a new instance of an application. As a result, the region is then further partitioned into operating regions: application views 310a-310n, event handlers 312a-312Y, and applets 314a-314Z.

Each applet is then given address space within the application's address space 302a-302n once the applet is executed within the application. The applet address space is structured similar to that of the application address space, reserving a region of memory for applet views 320a-320b, and applet event handlers 322a-322c.

In the current embodiment, the region 302 allocated by the operating system 202a to applications upon startup can be expanded as is necessary by requesting the operating system 202a allocate additional address space global memory 304. Likewise, application regions 302a-302n can be expanded as is necessary by sending a request to the operating system 202a. Applets can request additional applet memory 324 from their parent applications 302a-302n, which either deny the applet the additional memory, allocate additional memory from the applet's global memory 316, or request additional memory from the operating system 202a.

FIGS. 4A-4K illustrate a progression of a display screen as the user interacts with an application user interface being executed on communication apparatus 200 or other communication apparatuses according to embodiments.

Figure 4C:
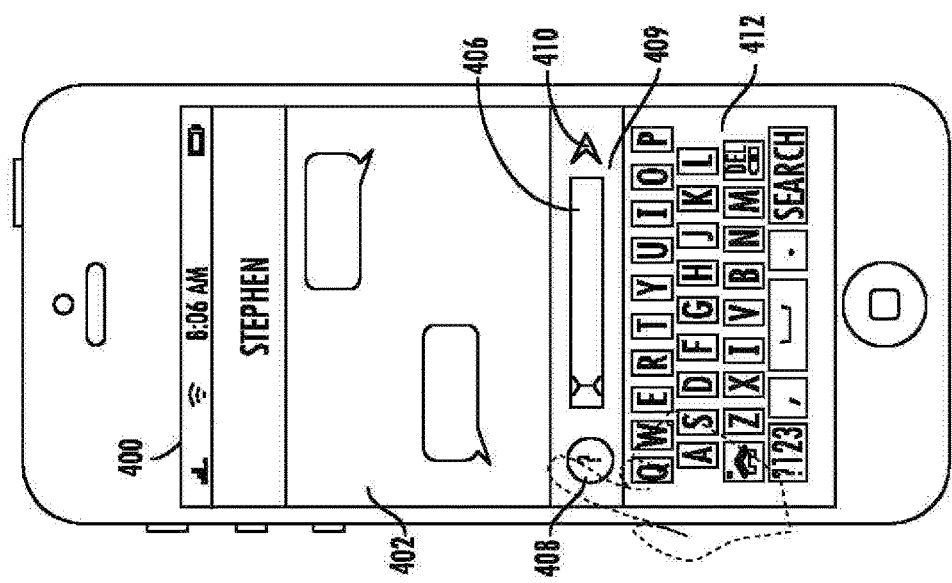
FIGS. 4A-4K illustrate an exemplary progression of a search query being input to the communication apparatus and displayed within the keyboard region of the display screen.
Figure 4B:
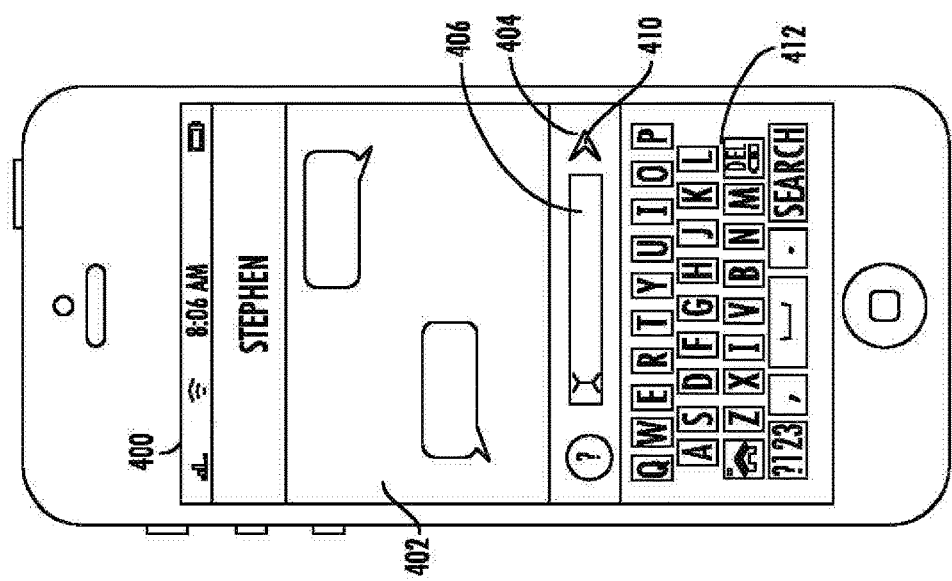
Figure 4A:
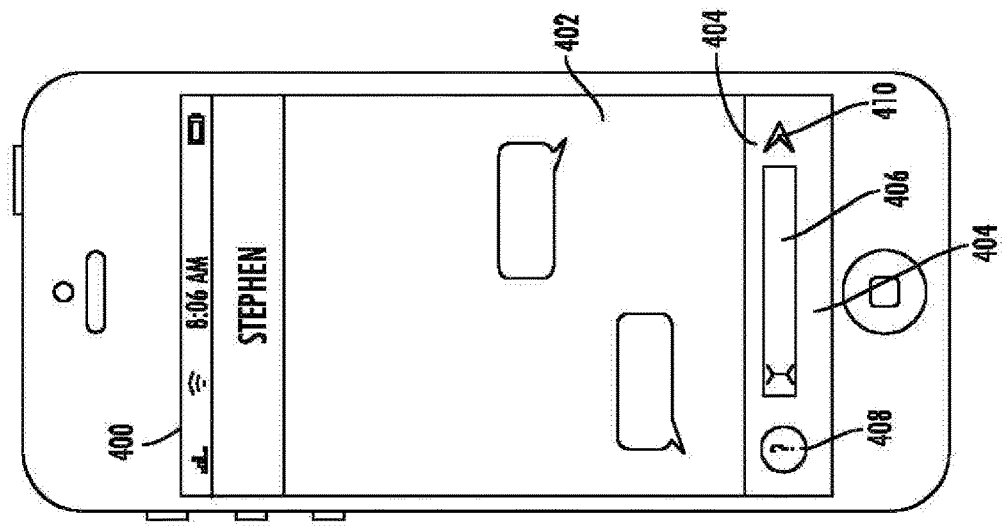

FIG. 4A illustrates the interface of a messaging application in a default state. The messaging application contains a search applet button 408, a message input field 406, a message bar 404, a message transmission button 410, and a message screen 402, which is displayed on the communication apparatus display 400. The message screen 402 may or may not contain transmitted and received messages.

FIG. 4B illustrates the interface of FIG. 4A after the communication apparatus 200 has detected user input within the region of the display 400 associated with the message input field 406. As a result of detecting user input within the message input field 406, the messaging application executes a keyboard applet, which is displayed in a keyboard screen 412.

FIG. 4C illustrates the interface of FIG. 4B as the search applet button 408 is actuated, which results in the search applet's execution on the communication apparatus 200.

Figure 4F:
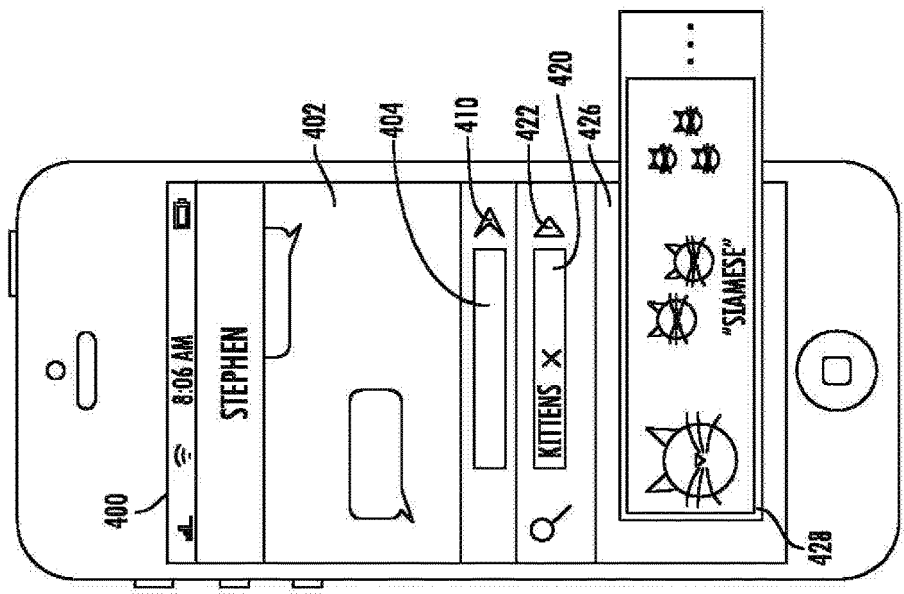
Figure 4E:
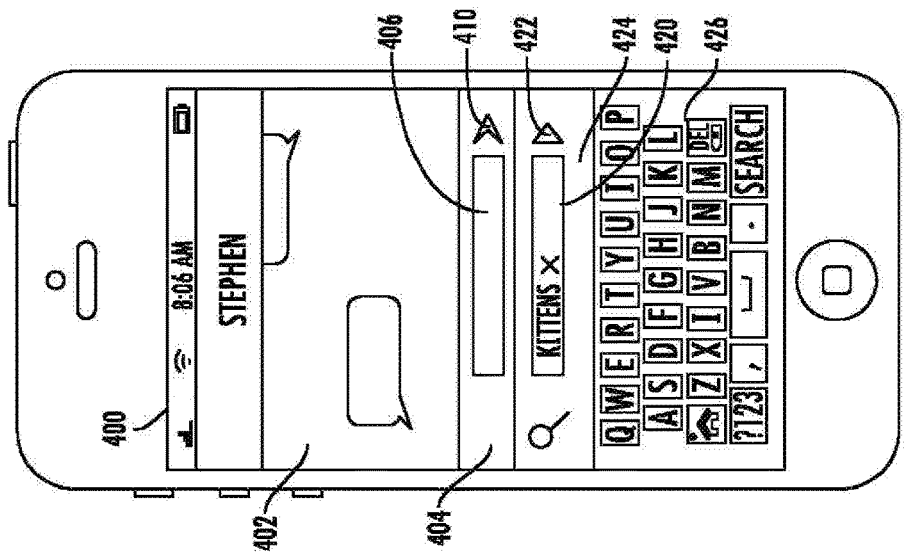
Figure 4D:
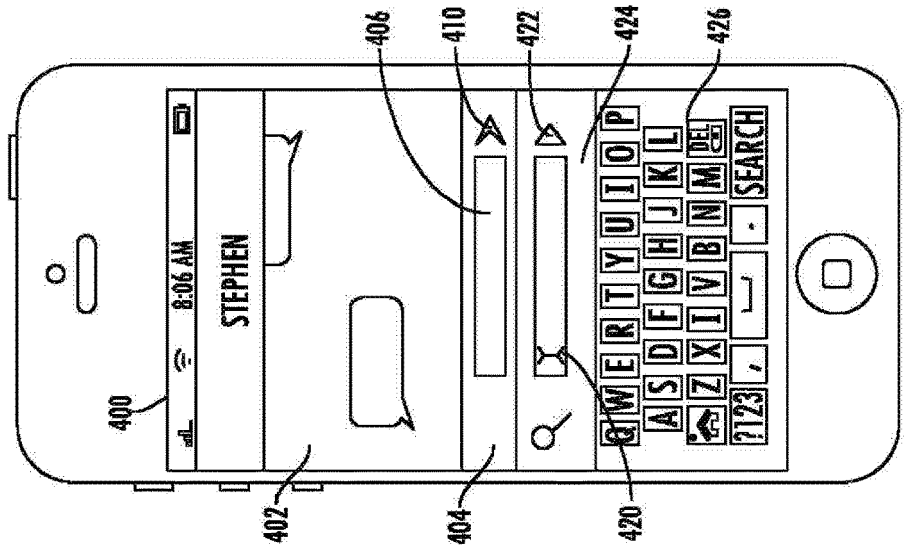

FIG. 4D illustrates the interface of the communication apparatus 200 after the search applet is executed. As shown in the embodiment depicted in FIG. 4D, the keyboard displayed in the keyboard screen 412 is replaced by a search applet keyboard 426. It will become apparent to one skilled in the art that alternative embodiments can be implemented in which the messaging keyboard can remain on the display within the keyboard screen 412 and used to receive search input from a touch sensitive display. Displayed between the search applet keyboard region 426 and the message input field 406 is a search input field 420, search input jump bar 424, and a search transmission button 422.

FIG. 4E illustrates the interface of the communication apparatus 200 as embodied in FIG. 4D. The depicted embodiment includes a set of characters "KITTENS" being input in the search input field 420.

FIG. 4F illustrates the interface of the communication apparatus 200 following the selection of the search transmission button 422. As a result of user actuation of the search transmission button 422, the search applet keyboard region 426 is replaced with media content 428 which contains a set of media elements that are displayed within the search applet keyboard region 426.

Figure 4I:
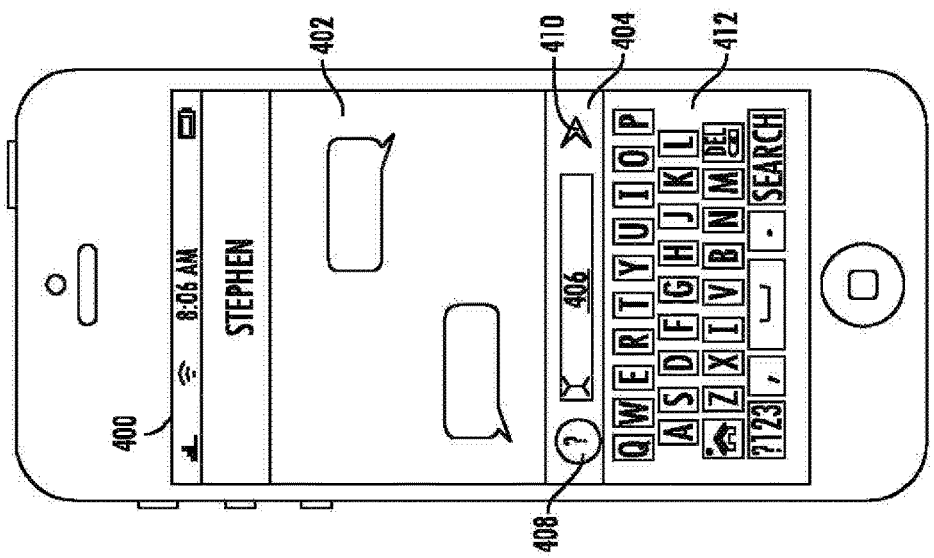
Figure 4H:
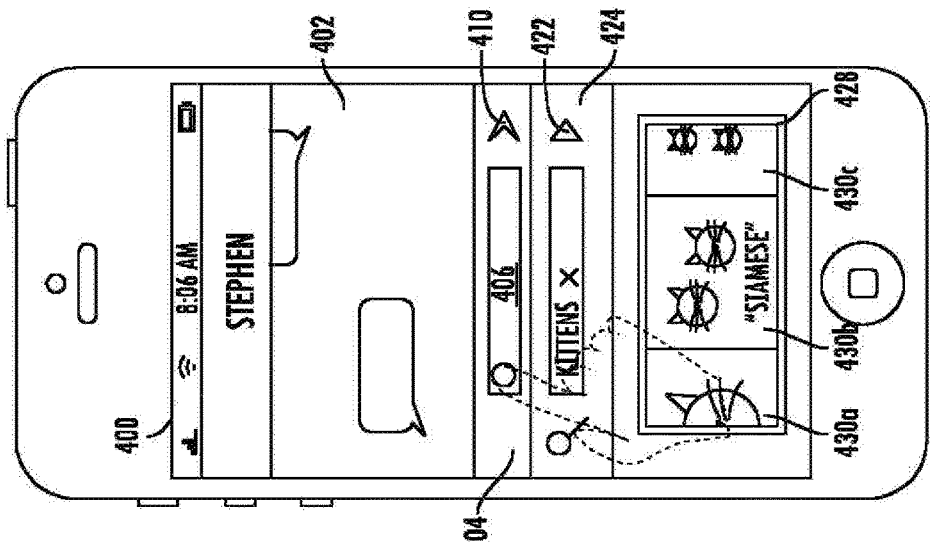
Figure 4G:
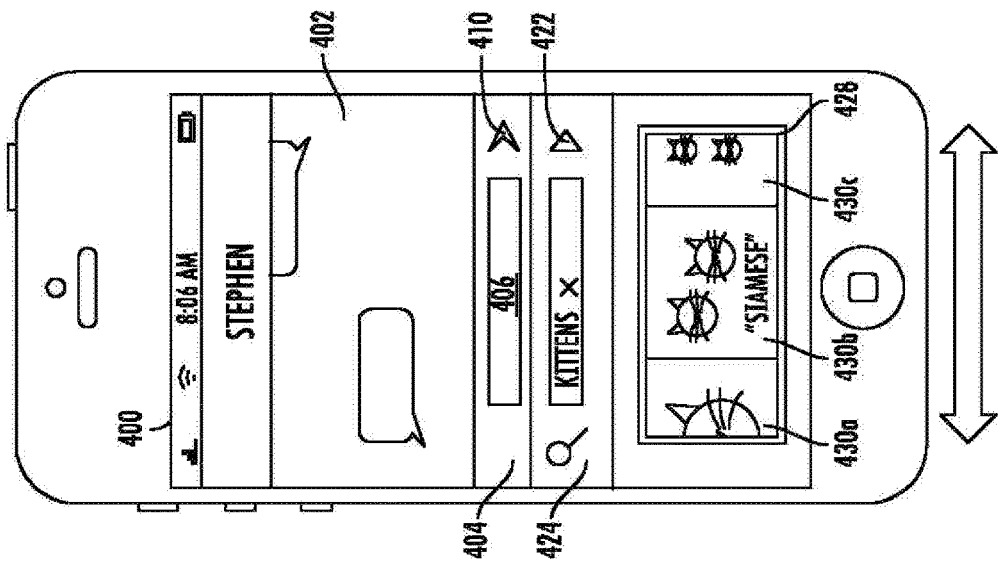

FIG. 4G illustrates the interface of FIG. 4F, and further depicts the media elements being translated across the display within the search applet keyboard region 426.

FIG. 4H illustrates the interface of FIG. 4G, and further depicts user input on the touch-sensitive display. The user input depicted in FIG. 4H is input which falls within the message input field 406. Upon detection of the text input field, the communication apparatus 200 can either save the keyboard applet state as depicted in FIG. 4H, or alternatively discard the keyboard applet state.

FIG. 4I illustrates the initial messaging interface of FIG. 4B, in which the keyboard screen 412 replaces the search applet keyboard region 426. Further, the search input jump bar 424 is removed from the communication apparatus display 400.

Figure 4K:
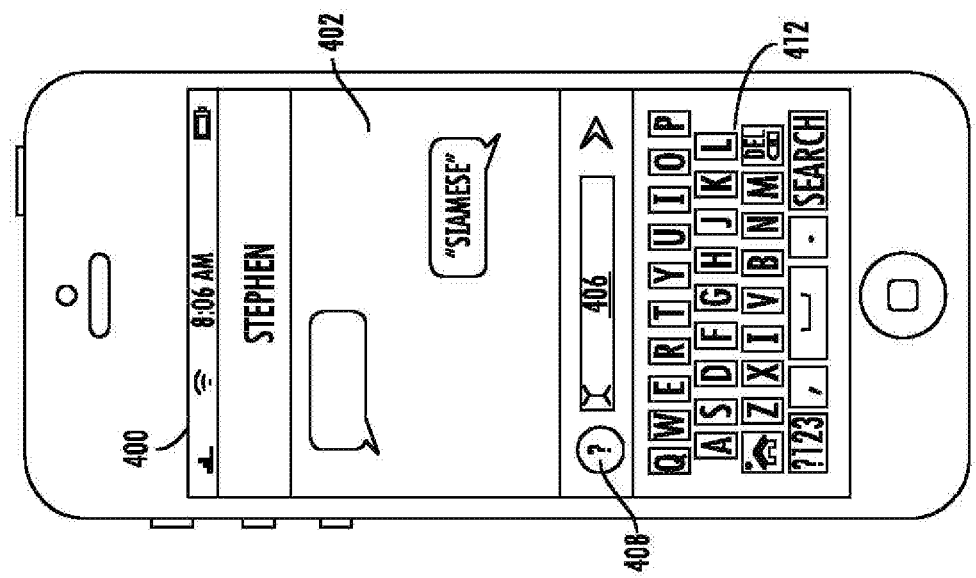
Figure 4J:
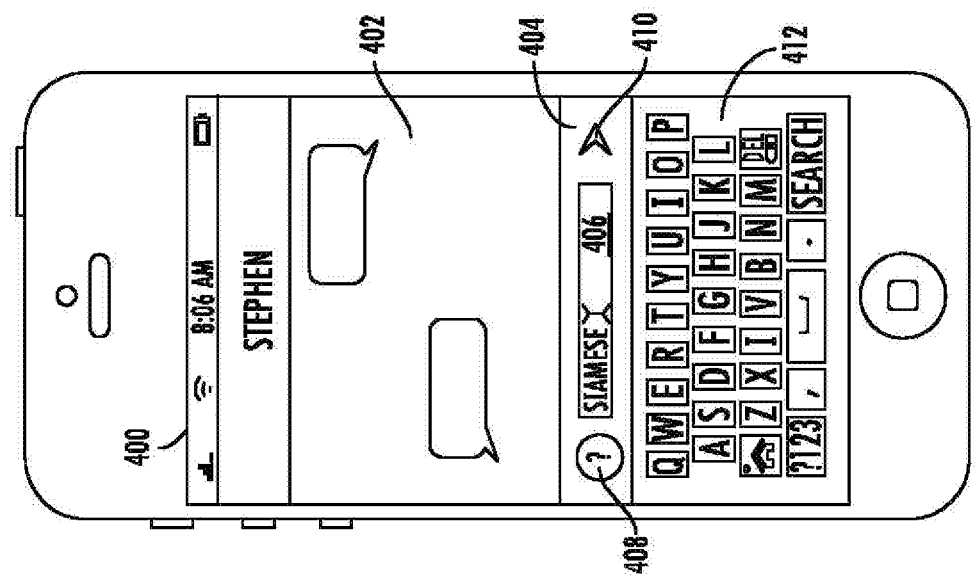

FIG. 4J illustrates the message interface of FIG. 4I with added text input into the message input field 406 to be transmitted after being discovered through execution of the search depicted in FIGS. 4E-4H.

FIG. 4K illustrates the transmission of the message through the message input field 406 to the intended recipient after user actuation of the message transmission button 410.

FIGS. 5A-5C illustrate exemplary embodiments of other user interfaces. FIG. 5A illustrates a user interface in which the search applet button 408a is located near the message input field 406 of the message bar 404 on the display 400.

FIG. 5B illustrates a user interface in which the search applet button 408a is located toward the bottom of the keyboard screen 412, which is located on the display 400.

FIG. 5C illustrates a user interface in which the search applet button 408c is located on the message bar 404 when the message bar is adjacent or near the bottom of the display 400 and the keyboard screen 412 is not located within the display 400.

Figure 6C:
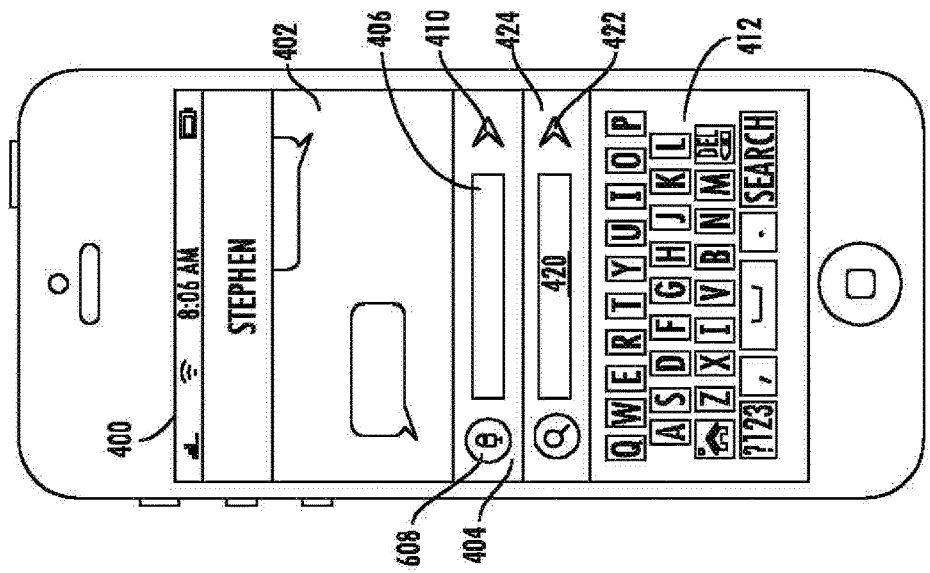
FIGS. 6A-6C illustrate exemplary embodiments of a messaging applet search interface.
Figure 6B:
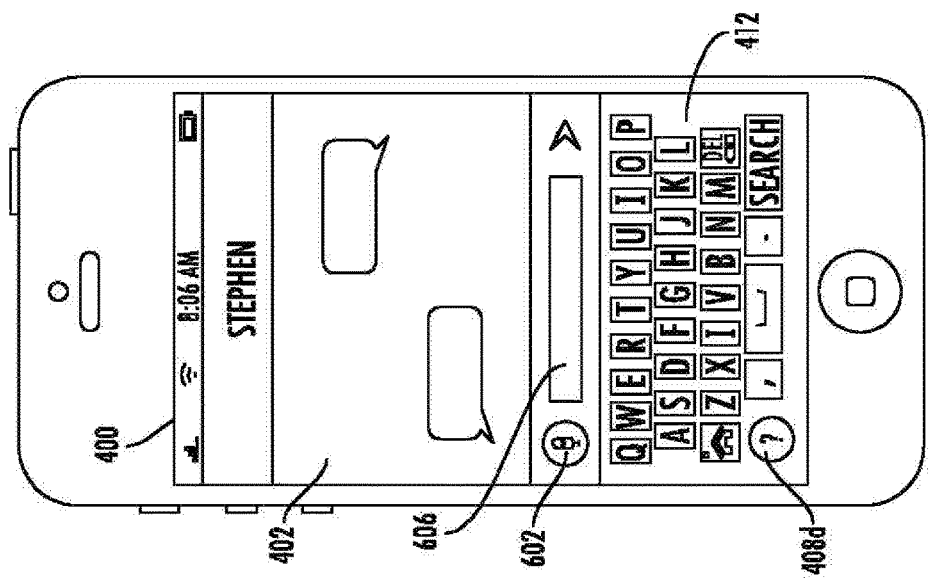
Figure 6A:
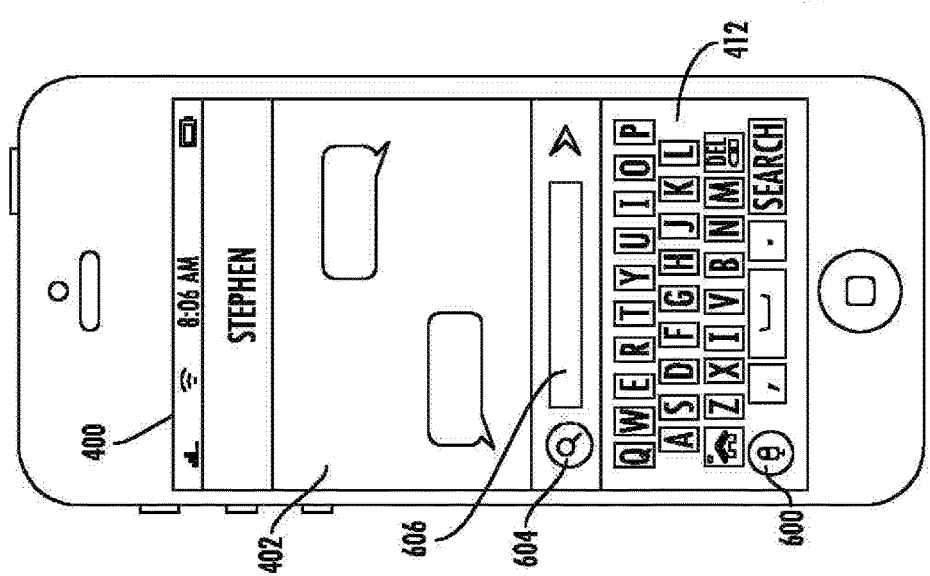

FIGS. 6A-6C illustrate exemplary embodiments of alternate user interfaces. FIG. 6A illustrates a user interface in which a voice query input button 600 is located toward the bottom of a display 400 and the voice query input button 600 is located on the screen in conjunction with a search input button 604. When either button is actuated, a search applet is executed.

FIG. 6B illustrates a user interface in which a voice input button 602 is located to the left of the message input field 606 and, upon actuation, accepts an input audio file which, in turn, is transferred to the message input field 606.

FIG. 6C is an illustration of a user interface depicted in FIG. 6B, in which the search jump bar 424, including the search input field 420 and the search transmission button 422, are located between the search keyboard screen 412 and the message bar 404.

Figure 7B:
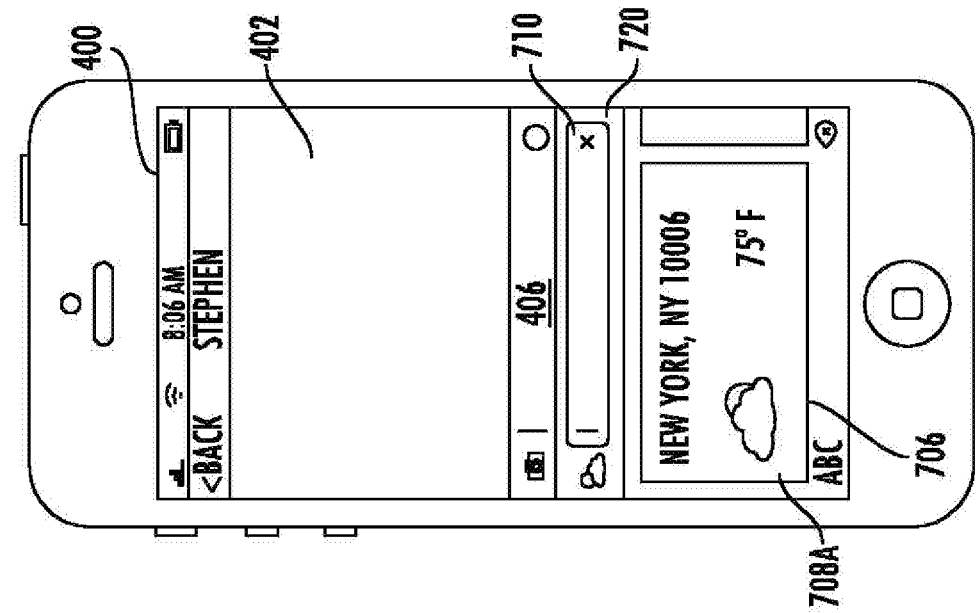
FIGS. 7A-7E are display screens of a communication apparatus illustrating an exemplary progression of a search query being input to the communication apparatus and displayed within the keyboard region of the display screen.
Figure 7A:
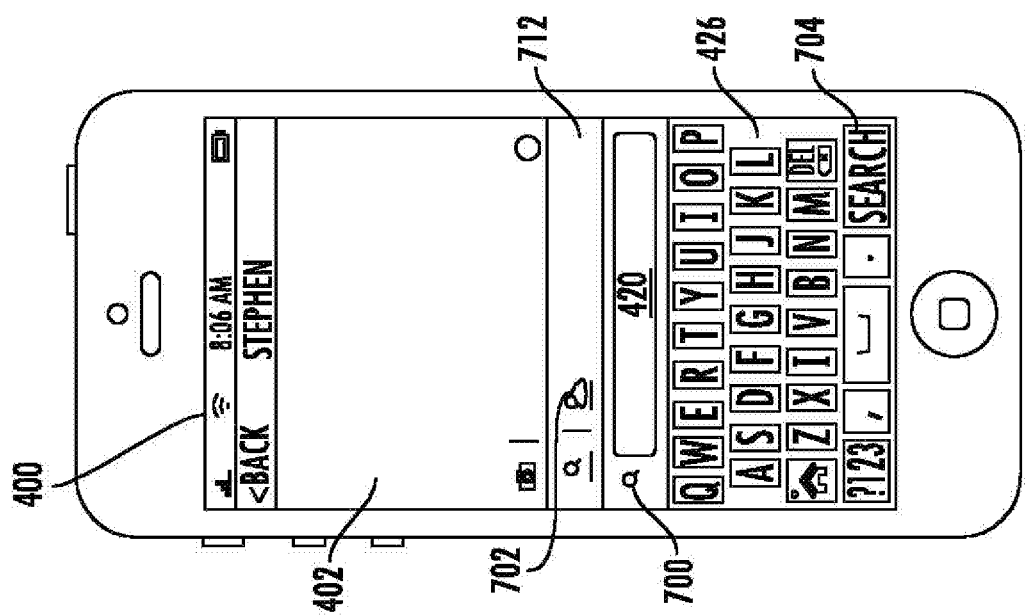

FIGS. 7A-7E illustrate an exemplary progression of an inline search in which the search is executed on a targeted database. FIG. 7A illustrates an initial search interface in which a search keyboard region 426 containing a search transmission button 704, search input field 420, and search database jump bar 712, is located toward the bottom of the display. The search database jump bar 712 is configured to display a plurality of direct search database options, such as a weather database button 702. The initial search interface also includes a default search button 700 which, when selected, changes the selected search server to the default search server. In some embodiments, the default search server is the private search server 120.

FIG. 7B illustrates an initial weather database search interface after actuation of a weather database button 702, which causes the search applet to execute a preliminary search based on communication apparatus state parameters. In certain embodiments, the communication apparatus parameters may include initial communication apparatus location data, such as the communication apparatus's coordinate location or approximated location, as well as default locations, in which the communication apparatus is frequently in or which have been set by the user as a default weather location to be queried on startup. As depicted, after actuation of the search database button 702 from the initial search state, a modified search jump bar 720 is displayed, with a weather search icon 730 displayed to the left of the search input field 710 indicating that input queries will have a search executed as a result of receiving an input in the search input field 710.

As a result of the preliminary search, the search input field displays within the search applet region 426 a series of media elements related to a search on the selected search database. As depicted, two media elements 708a, 708b are both displayed on the initial display. The display of the media elements 708a, 708b may be modifiable upon receipt of user input to the communication apparatus 200. As depicted in the embodiment of FIG. 4G, the resulting search media elements 708a-708c can be translated in a horizontal fashion across the communication apparatus display 400.

Figures 7C, 7D, 7E:
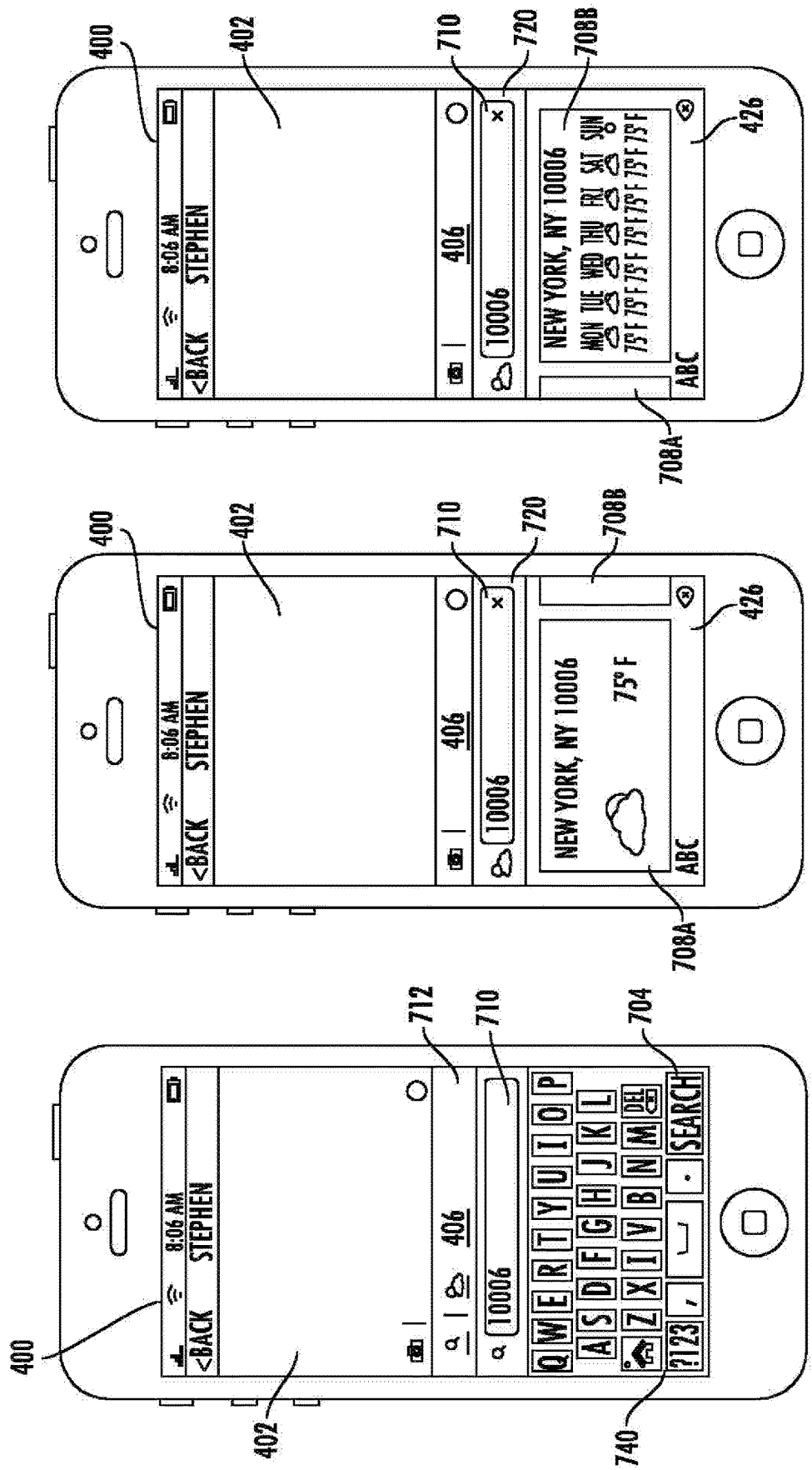

FIG. 7C illustrates the search interface of FIG. 7B after selection of the database specific input field 710 and subsequent receipt of input in the database specific input field 710. Upon selection of the database search input field 710 by a user, the listing of default media elements 708a and 708b within the resulting set of search media elements 706 is replaced with a search input keyboard 740.

FIG. 7D illustrates a second weather database search interface in which the weather server is queried a second time and displays weather information related to the input query text located in the search input field 710. The resulting search media elements 708a-708c are displayed in the search applet region 426 of the display 400.

FIG. 7E illustrates translation of the resulting search media elements 708a-708c across the search applet region 426 of the display as a result of detected user input.

Figure 8:
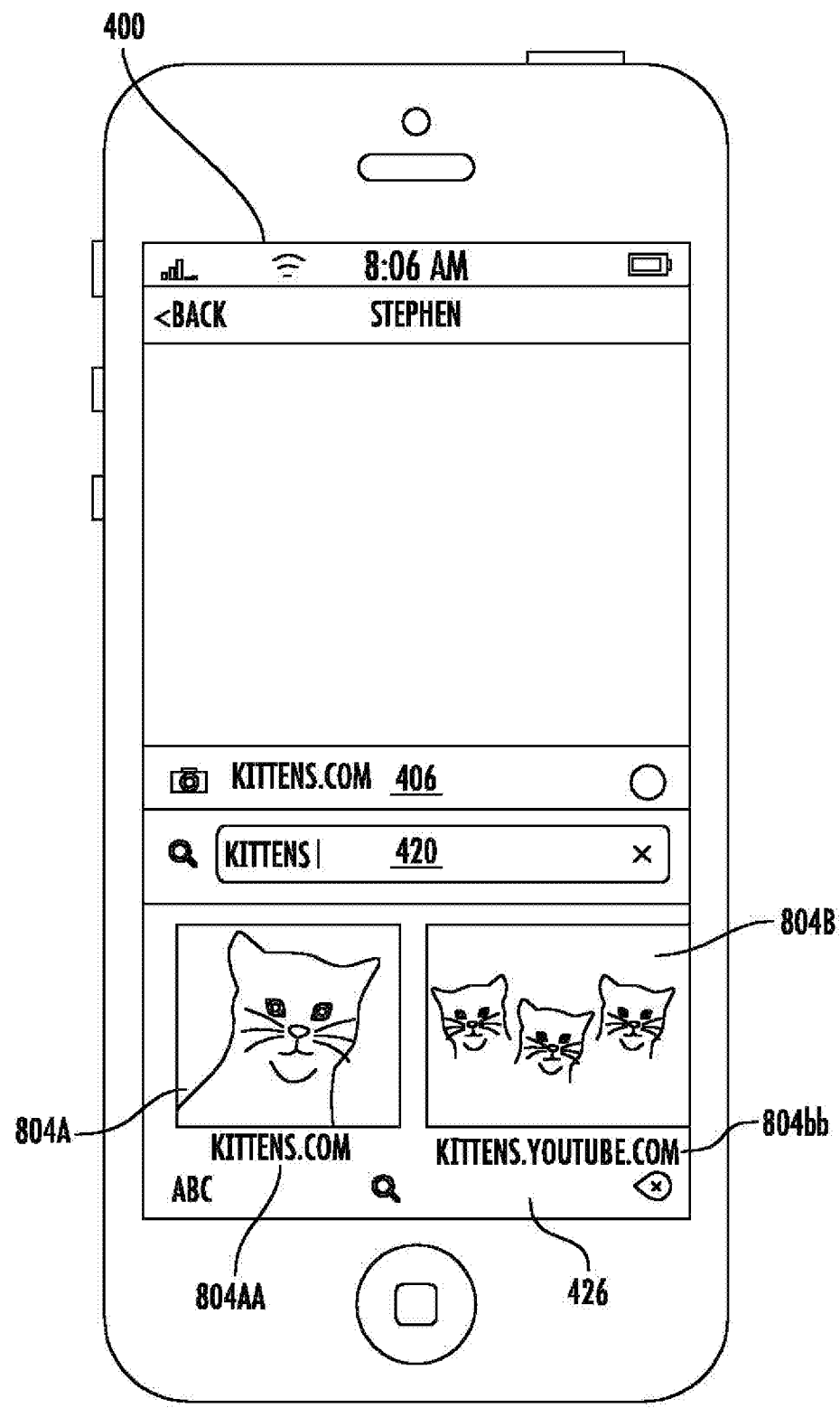
FIG. 8 illustrates an exemplary embodiment of a messaging applet search interface.

FIG. 8 illustrates an exemplary embodiment of a user interface, which includes a search keyboard applet displayed in the search applet region 426 of the display and includes a series of resulting search media elements 804a, 804b. The display illustrates the translation or movement of the metadata 804aa of a media element 804a into the message input field 406 for transmission to a message recipient.

Figure 9:
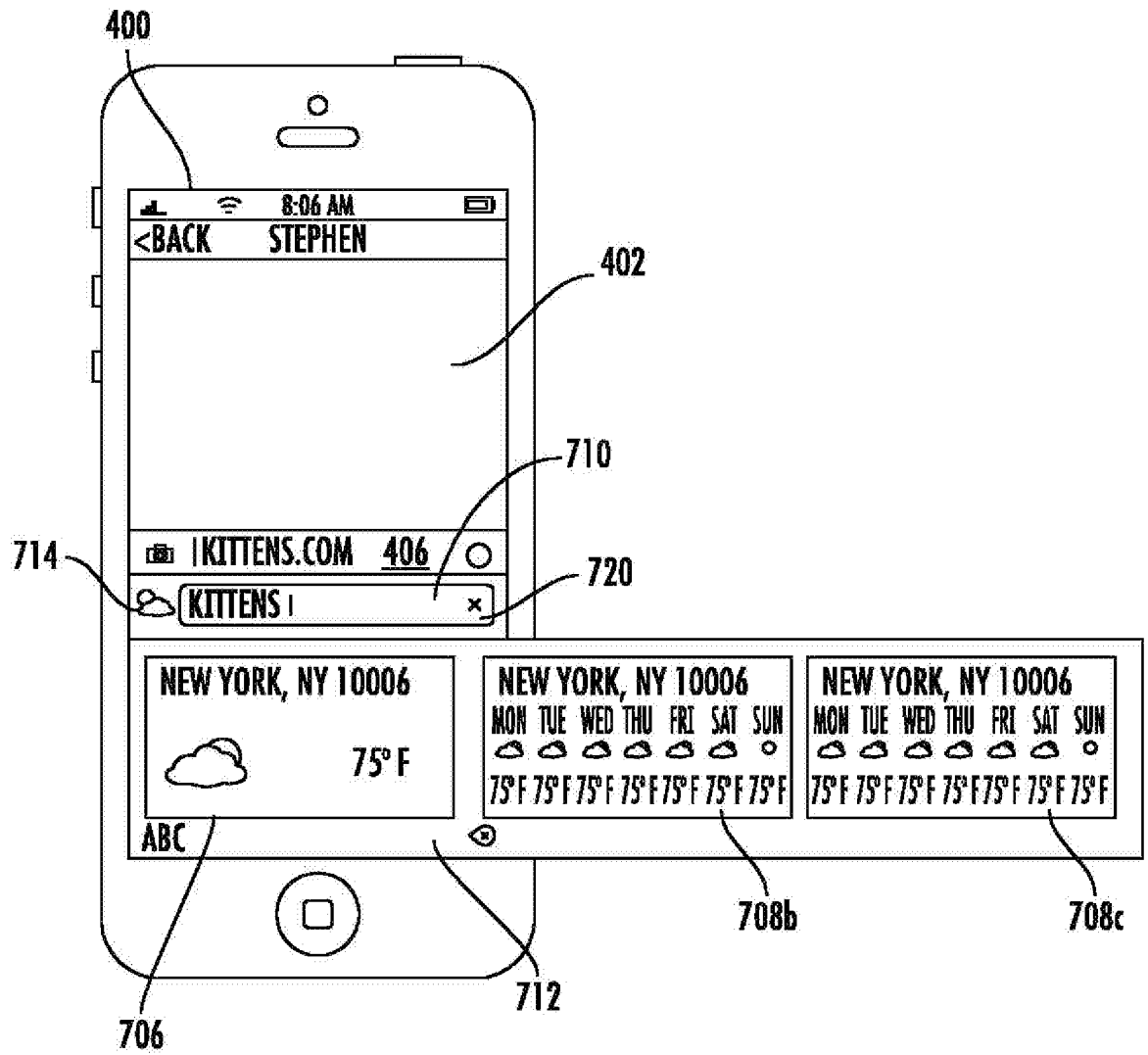
FIG. 9 illustrates an exemplary embodiment of a search applet state in which the search results can be scrolled through by a user in a horizontal direction in the keyboard region of the display screen.

FIG. 9 is an illustration of media elements 708a-708c which are displayed horizontally in an array, which, upon user actuation, can be translated across the search applet region 712 of the display 400. Also, included in the display is the word "KITTENS", which is input in the search input field 710 and subsequently determined to be incompatible with the selected server 714 and ignored.

Figure 10:
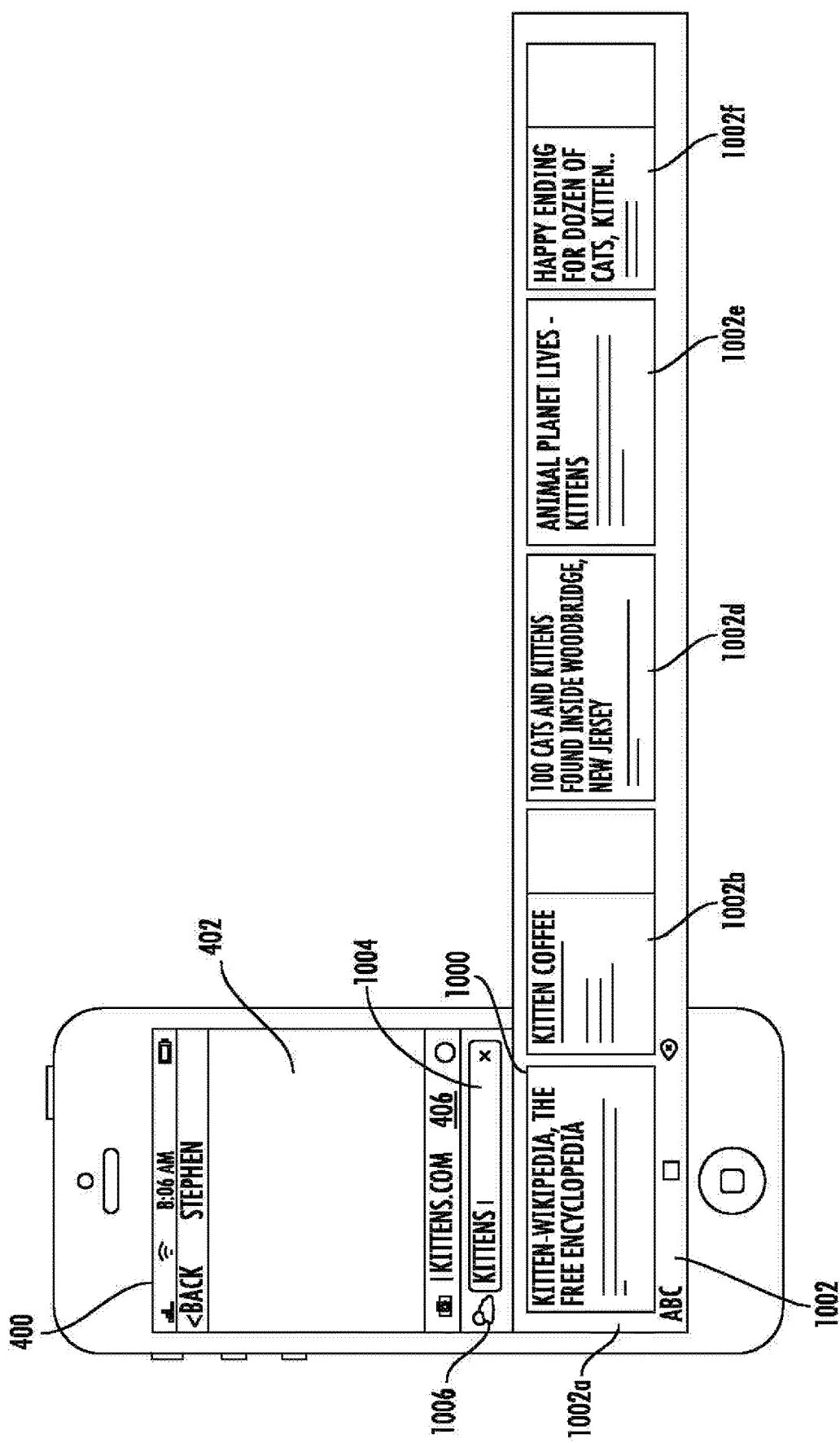
FIG. 10 illustrates an exemplary embodiment of a search applet state in which the search results can be scrolled through by a user in a horizontal direction in the keyboard region of the display screen.

FIG. 10 illustrates an exemplary search on the input query "KITTENS", which is received by the search input field 1004 within the search jump bar 1006. The input query is transmitted to a search server, which returns a search result array 1002. The returned search result elements 1002a-1002f are sorted by a private search server which queries a variety of public search servers, determines which results are the most appropriate in light of the search query, and truncates and returns the results determined to be the most responsive to the query. As depicted, the search elements come from a variety of search servers and sources, including a Wikipedia® result element 1002a, a local business result element 1002b, a local news article element 1002c, and Animal Planet® webpage elements 1002d and 1002e. The results array is displayed within the search applet region 1000 of the display 400. FIG. 10 further depicts an input query associated with the message input field 1004, the content of which corresponds to the content included in the results array 1002.

Figure 11C:
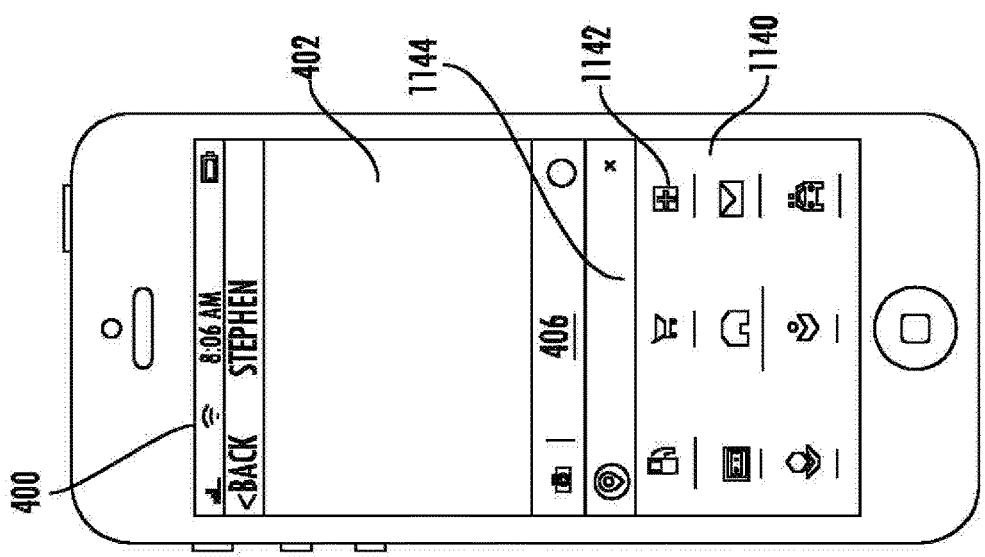
FIGS. 11A-11F illustrate exemplary embodiments of a search applet state in which the search applet executes a second applet and displays the results of the second applet within the search applet's allocated display region.
Figure 11B:
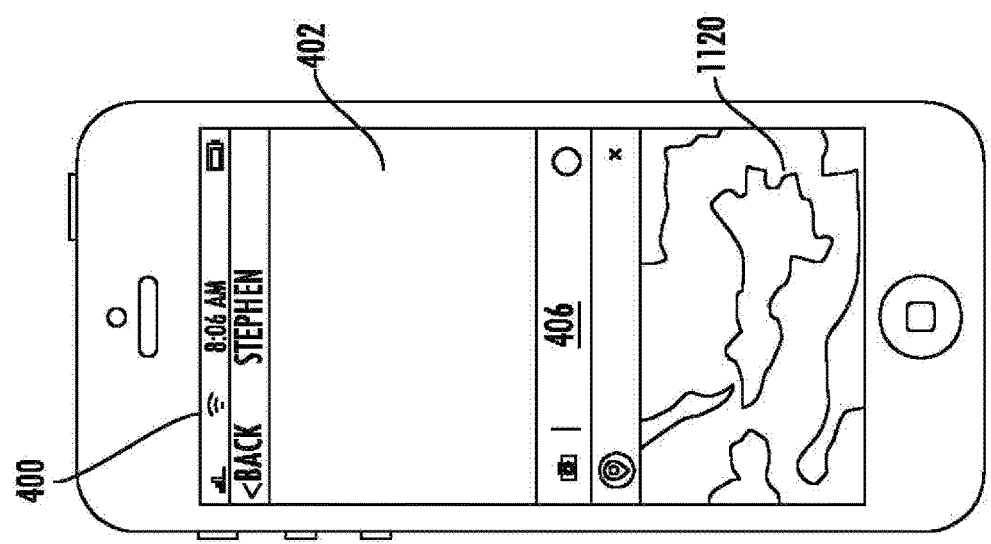
Figure 11A:
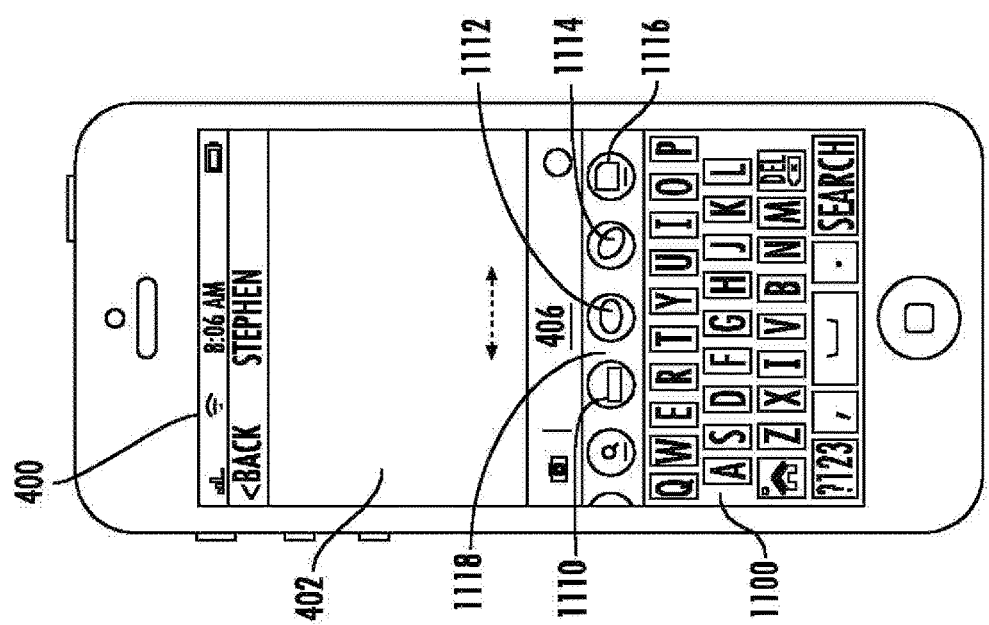

FIGS. 11A-11F illustrate exemplary embodiments of user interfaces and search applet states. FIG. 11A illustrates a search applet interface displayed within a search applet region 1100 of a display 400. The search applet region contains an array of search database buttons 1110, 1112, 1114, 1116 displayed within a search database and application jump bar 1118. As displayed, the search database and application buttons include a Yelp® button 1110, a private messaging button 1112, a weather database button 1114, and a news database button 1116.

FIG. 11B illustrates a search applet interface displaying a search applet search result applet 1120. The search applet search result applet 1120 is an interactive map which can be translated or moved across the screen along both the vertical and horizontal axis. This translation occurs within the search applet region 426 of the display 400.

FIG. 11C illustrates an alternative embodiment of a search database search result applet. The search database search result applet is enclosed within a search database search result applet region 1140 on the display 400. The search database search result applet region 1140 contains an array of sub-search database buttons 1142. Upon selection of a search database button 1142, the search applet may execute a default search query, a search query based on communication apparatus state information including communication apparatus non-input data such as location data, or a search query based on subsequent search query input received in the search input field 1144.

Figure 11F:
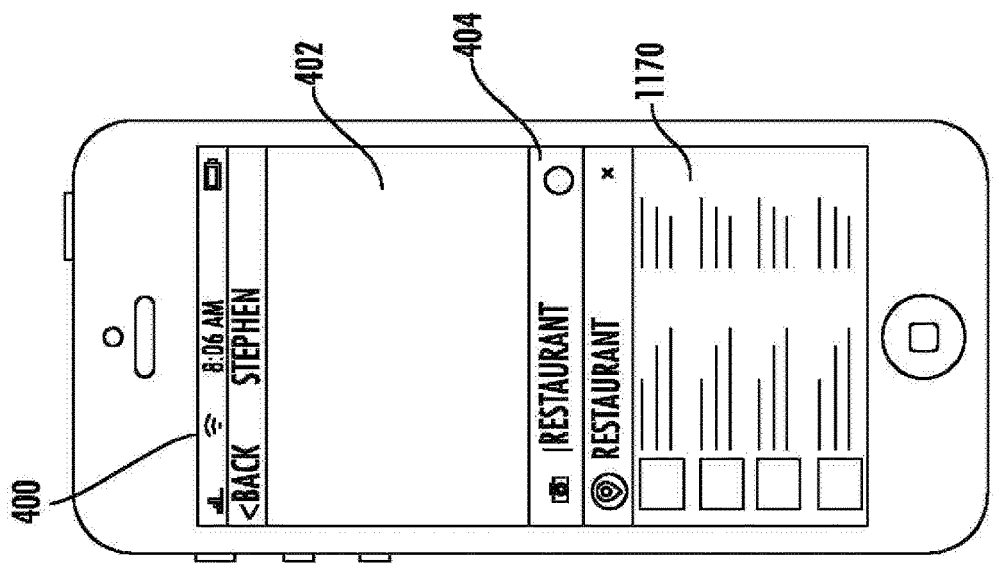
Figure 11E:
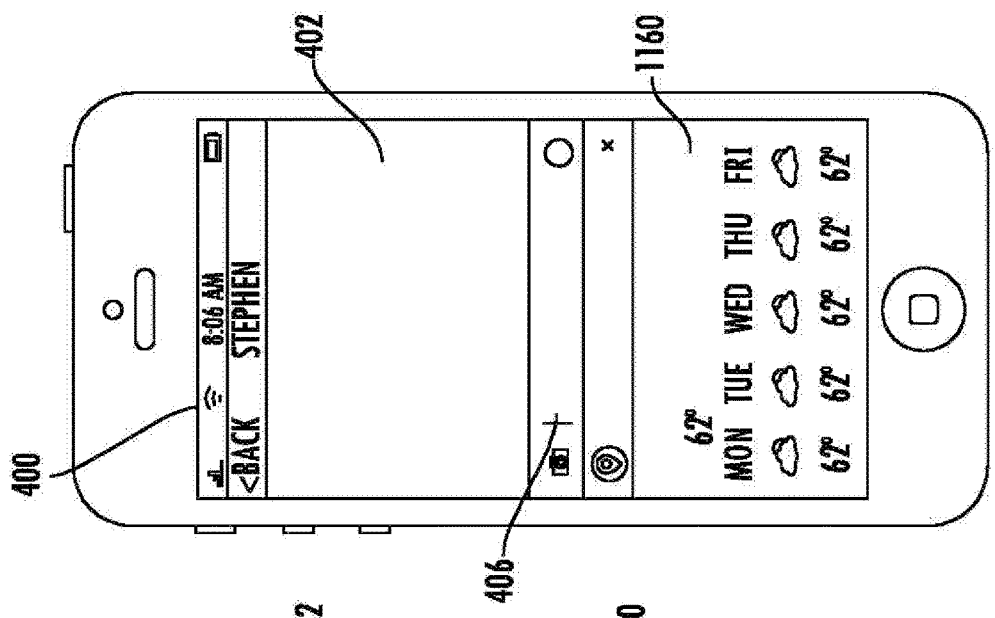
Figure 11D:
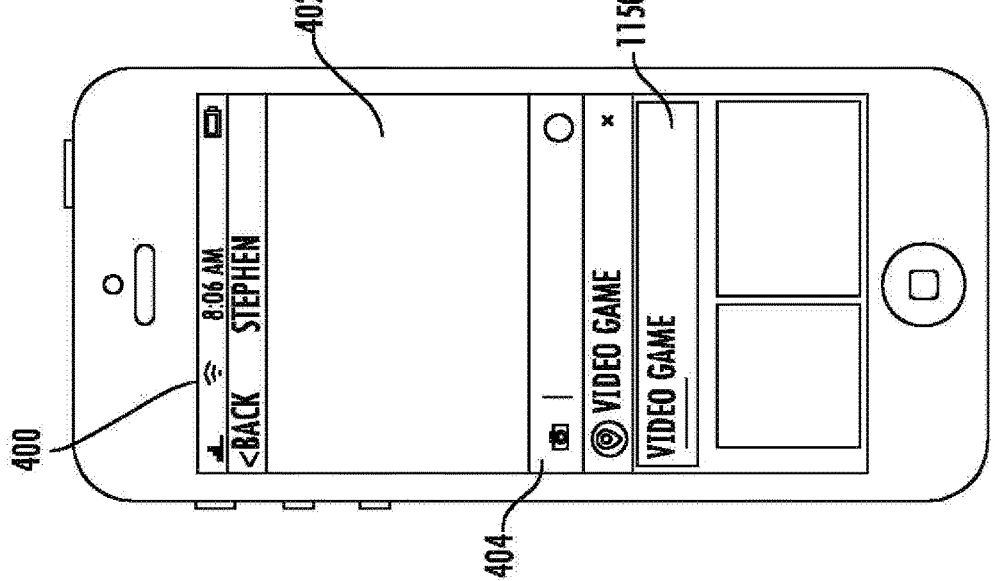

FIG. 11D illustrates an alternative embodiment of a search database search result applet, which is enclosed within a search database search result applet region 1150 on the display 400. The search database search result applet 1150 may be retrieved from a private search server 120, or alternatively may be stored in memory 202 or non-volatile memory 206. As depicted, the search database search result applet 1150 can be predefined as an index of searchable items, can execute predefined searches upon execution, can execute searches based on user input, and can return results from a specific database.

FIG. 11E illustrates an alternative embodiment of a search database search result applet. The search database search result applet is enclosed within a search database search result applet region 1160 on the communication apparatus display 400. The search database search result applet may be retrieved from a private search server 120, or alternatively may be stored in memory 202 or non-volatile memory 206. As depicted, the search database search result applet executes a predefined search upon execution, executes searches based on user input, and returns search results from a specific database.

FIG. 11F illustrates an alternative embodiment of a search database search result applet. The search database search result applet is enclosed within a search database search result applet region 1170 on the communication apparatus display 400. The search database search result applet may be retrieved from a private search server 120, or, alternatively, may be stored in memory 202 or non-volatile device memory 206. As depicted, the search database search result applet can execute a predefined search upon execution, can execute searches based on user input, and can return results from a specific database. The predefined search is executed based on communication apparatus 110 state data, such as location data, default search queries, or common search queries.

Figure 12:
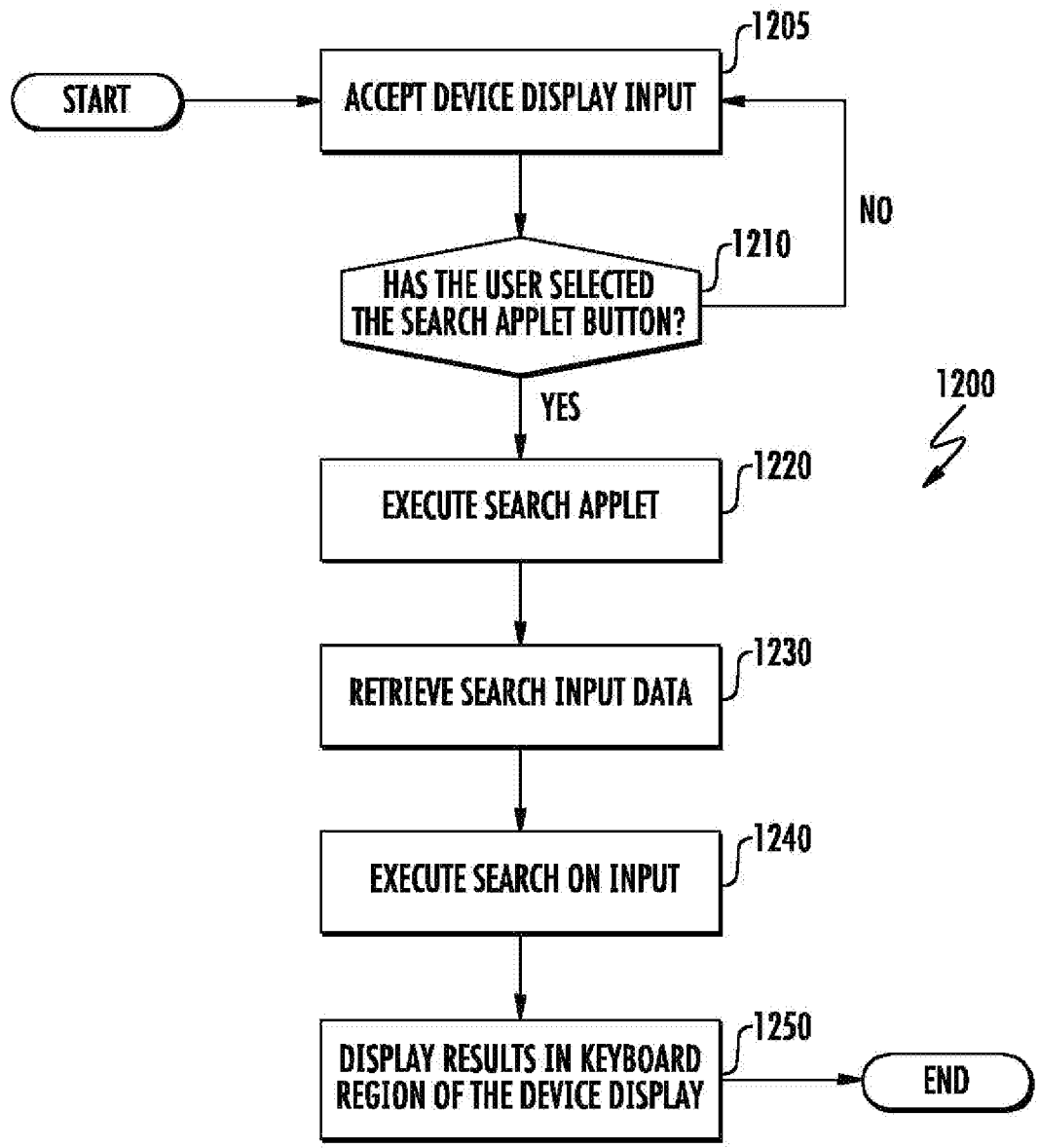
FIG. 12 is a flow diagram illustrating a process for performing a basic search according to embodiments.

FIG. 12 is a flow diagram illustrating process 1200 for performing a default search within a messaging application. In embodiments, process 1200 may be performed by communication apparatus 110.

At block 1205, user input data detected by a device display is recorded by the communication apparatus 110. Detection of communication apparatus display input may include detecting display 400 input within a predetermined region on a display. Each predetermined region corresponds to one or more keyboard buttons. Upon detection of the input, the communication apparatus determines if the input corresponds to a relevant input button, and, if so, records the data associated with the input button and checks for another input.

At block 1210, user selection of a search applet button is detected. This may include continuously detecting user input on a display 400 of a communication apparatus 110, and determining whether the detected input is located within a predetermined region of the display 400.

At block 1220, the communication apparatus executes a search applet, which may include, after detecting user selection of a search applet button 408, loading search applet instructions into the messaging application's predefined memory region designated for applets and executing the instructions on a processor of the communication apparatus 110.

At block 1230, the communication apparatus retrieves search input data. Retrieval of search input data may include retrieving user input from a search input field 420. The input retrieval process is a process 1210 which may include detecting communication apparatus input within a predetermined region on a communication apparatus 110. Each predetermined region may correspond to one or more keyboard buttons. Upon detection of the input, the communication apparatus determines if the input corresponds to a relevant input button, and, if so, records the data associated with the input button and checks for another input.

At block 1240, the communication apparatus executes a search on the retrieved search input data recorded as a result of executing process 1230. The search may include transmitting the stored search input data to a private search server, or, alternatively, to a designated search server, awaiting receipt of search results from the query executed on the search data, and, once the query search results are received, storing the results in communication apparatus memory for display by the search applet.

At block 1250, the communication apparatus displays the received search results. Displaying the received results may include displaying, on the display 400 within the search applet region 426 of the display 400, the results either in a predetermined manner or in a manner defined by the queried server.

Figure 13:
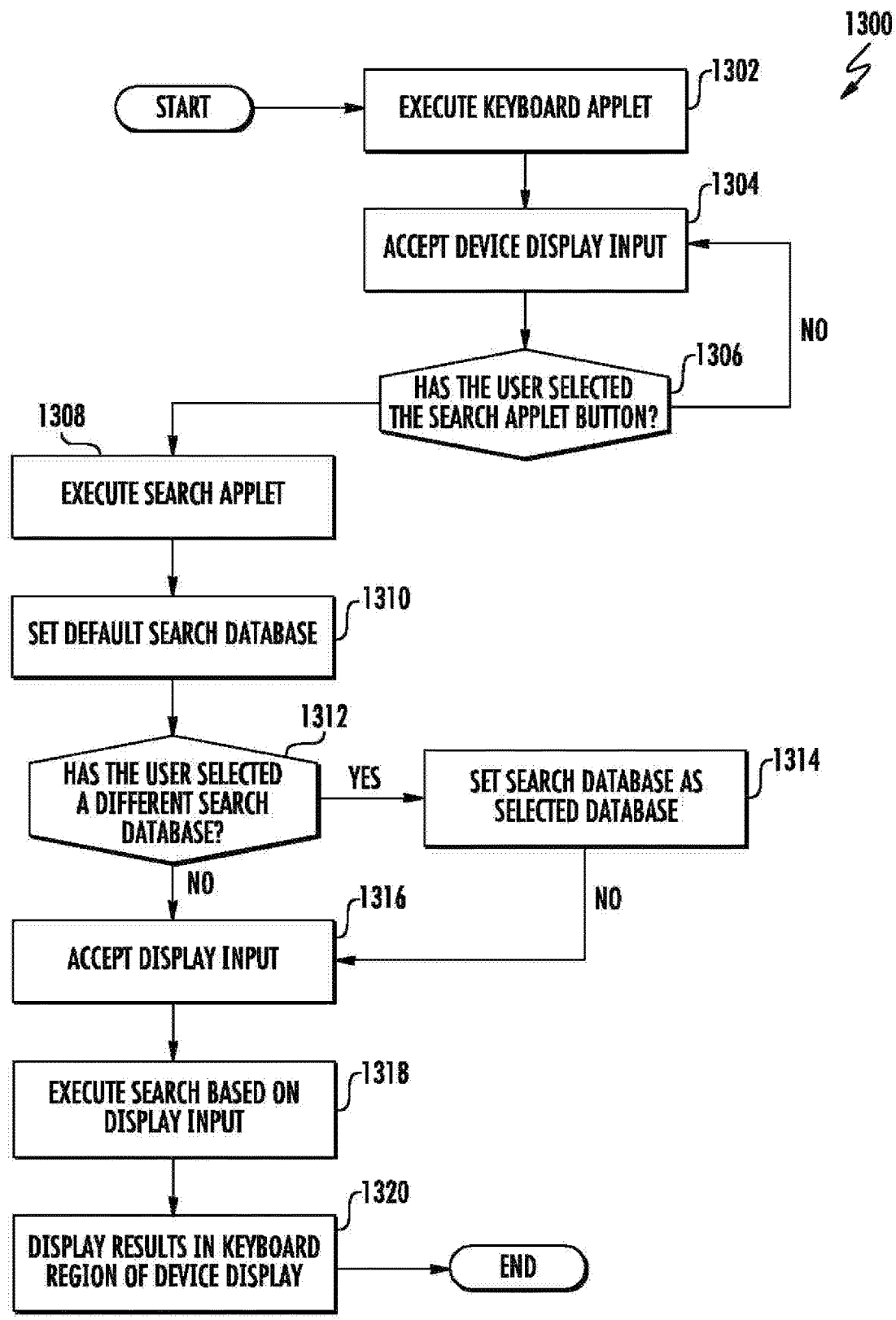
FIG. 13 is a flow diagram illustrating a process for execution of a search applet and selection of a particular search database on which to execute the query according to embodiments.

FIG. 13 is a flow diagram illustrating a process 1300 for performing a search within a messaging application. The search may query either a private search database or a designated search database. In some embodiments, process 1202 may be performed by one or more components, communication apparatuses, or modules, such as, but not limited to, communication apparatus 110.

At block 1302, the communication apparatus loads and executes a keyboard applet in the communication apparatus memory. Execution of the keyboard applet may include loading search applet instructions into the messaging application's predefined memory region designated for applets and executing the instructions on the processor of a communication apparatus 110.

At block 1304, the communication apparatus accepts input via the display 400. Accepting input via a display may include detecting input within a predetermined region on a display 400. The predetermined region may include sub-regions corresponding to one or more keyboard buttons. Upon detection of the input, the communication apparatus determines if the input corresponds to a relevant input button, and, if so, records the data associated with the input button and checks the communication apparatus display 400 for another input.

At block 1306, communication apparatus determines whether the user has selected the search applet button 408, which is displayed within a keyboard screen 412 of a messaging application on a display 400. The determination of whether the user has selected the search applet button 408 may include detecting user input within a predetermined region of the display 400. If user input is detected within a predetermined region of the display 400, process 1308 may be executed. Otherwise, if user input is not detected, process 1304 is executed.

At block 1308, the communication apparatus executes a search applet. The execution of the search applet may include, after detecting user selection of a search applet button 408, loading search applet instructions into the messaging application's predefined memory region designated for applets and executing the instructions on a processor of the communication apparatus 110. Execution of a search applet may also include initializing a search packet, which may include search input text, search database information, and communication apparatus 110 state information.

At block 1310, the search applet sets a default search database. The process by which the search applet sets a default search database may include, upon execution, setting search database information in a search packet to default database information.

At block 1312, the search applet determines whether a different database has been selected. Determination as to whether the user selected a different search database may include detecting user input within a predetermined region of the display 400. If user input is detected within a predetermined region of the display 400, the operation of block 1314 may be executed so that the default search database information set during process 1310 is replaced with information corresponding to the database associated with the currently detected user input. If no user input for selecting a different search database is detected, process 1316 is executed.

At block 1314, the search applet sets a selected search database as the target database. Selection of a search database may include detecting user input within a region on the display 400 of the communication apparatus 110. Upon detection of the user input, it is determined whether the input location is within a predetermined region on the display. If the input location is within a predetermined region on the display 400, the database information stored in the search data packet is set as the information corresponding with the location of the detected input.

At block 1316, the search applet accepts input from the device display 400. Acceptance of display input may include detecting communication apparatus input within an array of predetermined regions on a display 400. Each predetermined region corresponds to one or more keyboard buttons. Upon detection of the input, the communication apparatus determines if the input corresponds to a relevant input button, and, if so, records the data associated with the input button and checks the communication apparatus display 400 for another input.

At block 1318, the search applet executes a search upon receiving input from process 1316. Execution of a search may include transmitting a search packet to a search database or databases. The search packet may contain a search query, search database information, and communication apparatus 110 state information, if available. Upon transmission, communication apparatus 110 receives search result media, which is stored in memory 202 associated with the search applet for display on the display 400 of the communication apparatus 110 within the search applet region 426.

At block 1320, communication apparatus displays the results upon receiving the results from process 1318. Displaying results within the keyboard region of a communication apparatus may include displaying within the search applet region 426 of the display 400 the search result media either in a predetermined manner or in a manner defined by the queried server or servers.

Figure 14:
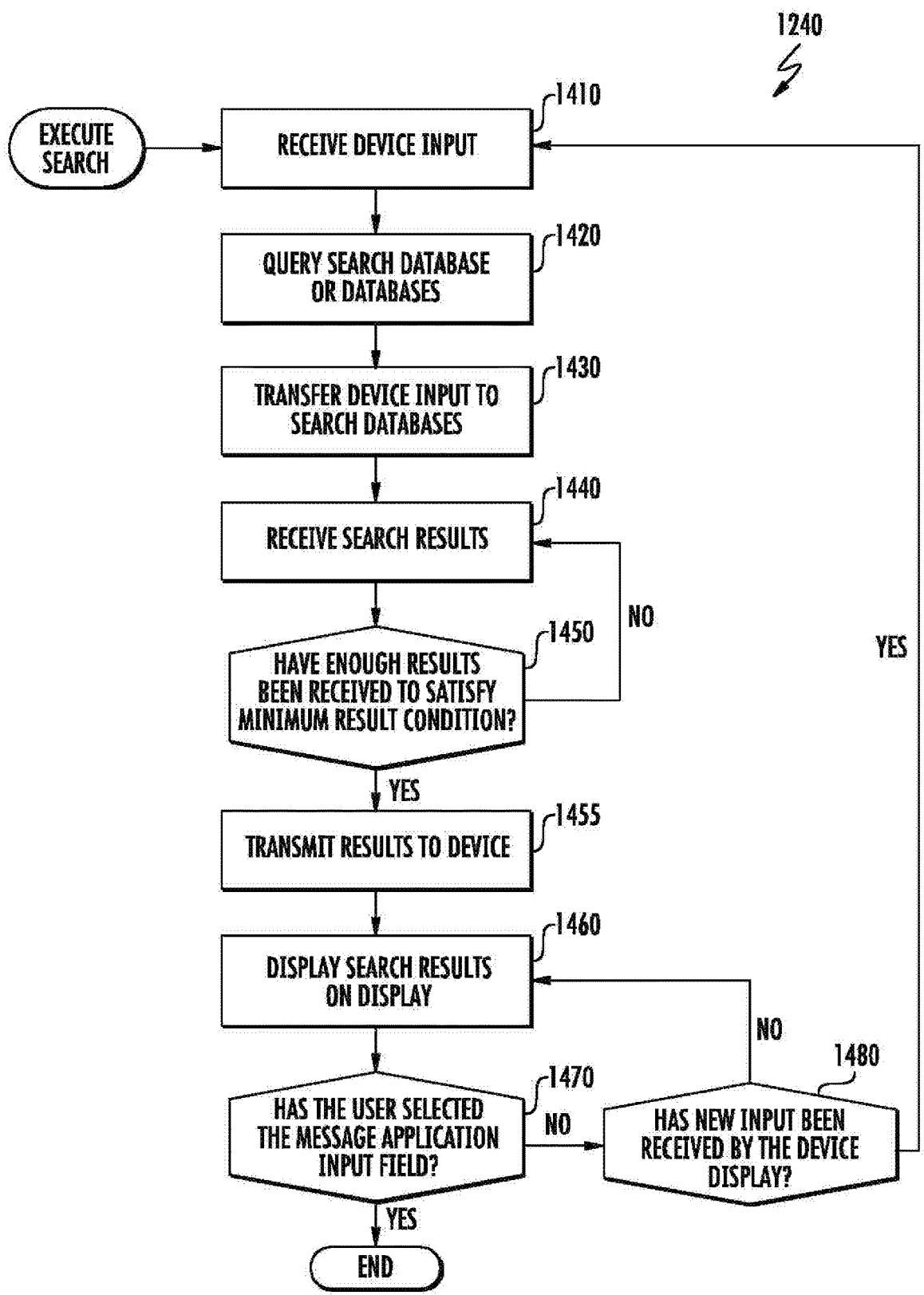
FIG. 14 is a flow diagram illustrating execution of a search on multiple search servers according to embodiments.

FIG. 14 is a flow diagram illustrating a process 1240 for executing a search within a search applet. The search results are displayed within the search applet region 426 of the display 400.

At block 1410, the communication apparatus receives input via the device display. Reception of input may include detecting input within an array of predetermined regions on a display 400. Each predetermined region may correspond to one or more keyboard buttons. Upon detection of the input, the communication apparatus determines if the input corresponds to a relevant input button, and, if so, records the data associated with the input button and checks the communication apparatus display 400 for another input.

At block 1420, the communication apparatus transmits a query to at least one search database. Querying at least one search database may include transmitting a search packet to a search database via a functional connection 104*a*. The search packet may contain a search query, search database information, and communication apparatus 110 state information, if available.

At block 1430, the search database transfers the relevant query information received from process 1420 to one or more public search databases. Transferring the query to a public search database may include transferring the search query to one or more public search servers 130*a*-130*n* to execute a search in relation to the query via functional connections 104*b*-104*n*. Process 1430 may further include transferring additional information to one or more public search databases. The additional information may include communication apparatus 110 state information, which may further include communication apparatus location information or user data.

At block 1440, the search server receives results relating to the search query. Receiving search results may include receiving results from one or more queried public search servers 130*a*-130*n* via functional connections 104*b*-104*n*, and storing the search results within memory 202 or non-volatile memory 206 on a private search server 120.

At block 1450, the private search server determines whether enough results have been received to transmit a successful search query result. The determination as to whether enough search results have been received, for example, to satisfy a minimum search result condition may include executing an instruction on the private search server 120 to compare the total amount of results received with a predetermined minimum amount of results necessary for a search result. In determining whether the result condition is met, the determination may further include determining the difference between the time the query is transmitted and the time the determination of process 1450 is made. A private search server may reduce the amount of results or return to the communication apparatus an indication that results could not be obtained if the difference exceeds a predetermined threshold.

At block 1455, private search server transfers the search results to the querying communication apparatus. Transfer of a search result set to a communication apparatus 110 may include aggregating the search results stored on a private search server 120, identifying the most relevant search results based on predefined result quality criteria, truncating the results where the results exceed a predetermined result limit, and transmitting the results to the initial querying communication apparatus 110 via a functional connection 104*a*. The process of transferring a search result set to a communication apparatus 1455 may further include converting the search result elements of the search results into a format optimized for display within the search applet region 426 of a display 400 of a communication apparatus 110.

At block 1460, communication apparatus displays the results of the search query within the search applet keyboard region 426 of the display 400. The search result media elements may be displayed in a predetermined manner or in a manner defined by the queried servers within the search applet keyboard region 426. Where the search result media elements are search result applets, upon detection of user input located within a region of the display corresponding to the search result applet, the search result applet is executed and the response is displayed in the search applet keyboard region 426 of the display 400.

At block 1470, the communication apparatus determines whether the user has selected the message input field 406 after displaying the results from process 1460. Determining whether the user has selected the message input field 406 associated with the messaging application may include detecting user input on the display 400, and continuously determining whether the input location corresponds to the location of the message input field 406 is displayed on the display 400. If user input is detected, but the user input is not determined to be in a location corresponding to the location of the message input field 406, then process 1480 is executed; otherwise, process 1400 terminates.

At block 1480, the communication apparatus determines whether user input for the search applet has been detected. This may include executing process 1460 of displaying search results on the display if no input is detected; otherwise, process 1410 of retrieving input data is executed.

Figure 15:
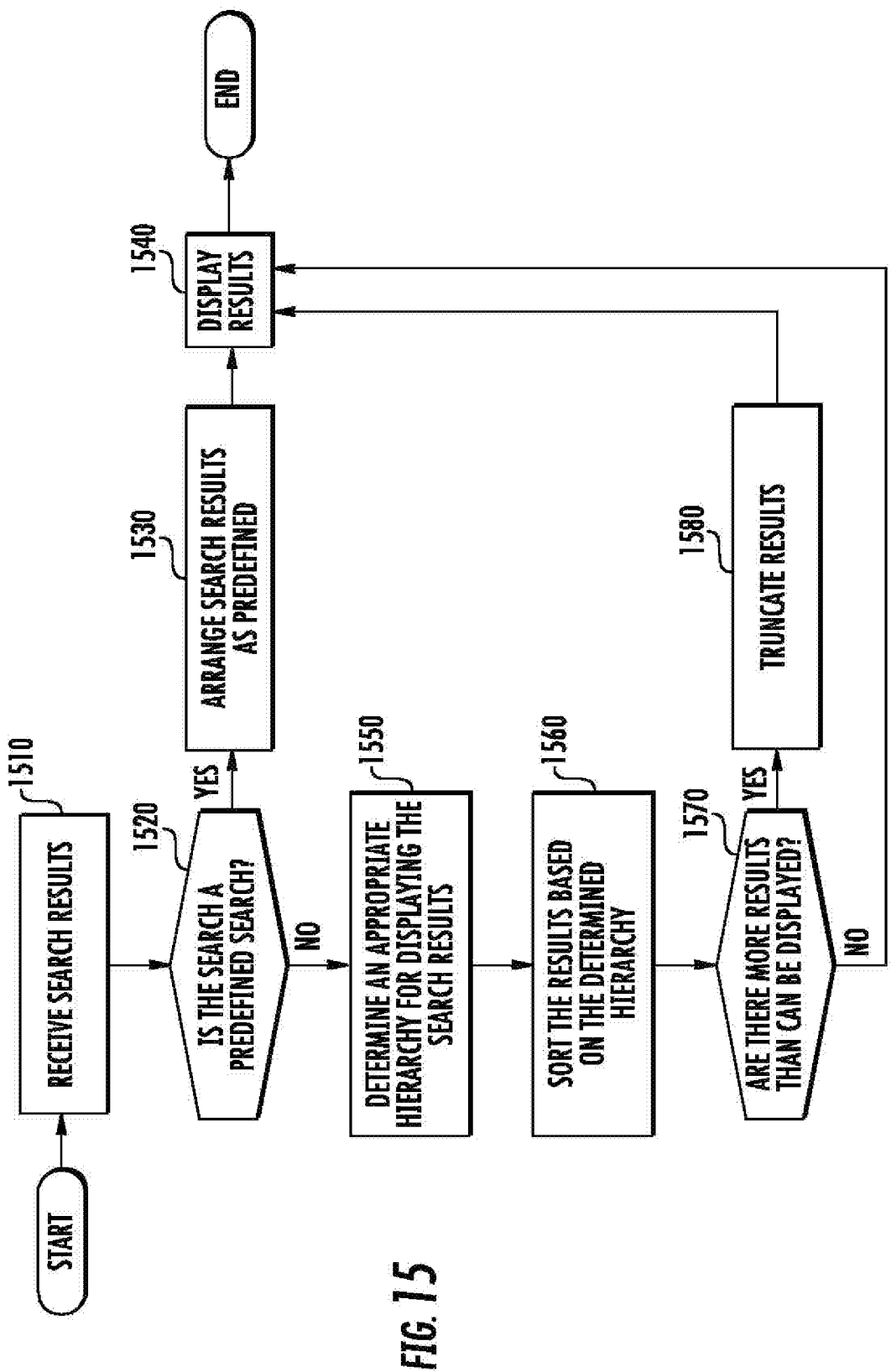
FIG. 15 is a flow diagram illustrating a search applet displaying an abbreviated selection of search results according to embodiments.

FIG. 15 is a flow diagram illustrating process 1500 for search results on a communication apparatus 110. The search results are either ordered in a predetermined order by a private search database, or ordered by the search applet on the communication apparatus 110. In some embodiments, process 1500 may be performed by one or more components, communication apparatuses, or modules such as, but not limited to, communication apparatus 110.

At block 1510, the communication apparatus receives search results. Reception of search results may include receiving a packet of search results from a private search server 120 or receiving a plurality of search results from one or more public search servers 130*a*-130*n*.

At block 1520, the communication apparatus determines whether the search results are part of a predefined search query. This may include identifying whether the transmitted search query is a predefined search query. One example of a predefined search query is the transmission of location data and a weather search tag to a private search server 120 or public search servers 130*a*-130*n*. Upon receipt of the weather search tag, private search server 120 or public search servers 130*a*-130*n* identify the relevant search response data and returns the data.

At block 1530, the communication apparatus displays the results in a predefined manner. This may be performed by parsing the retrieved search response data received from process 1520, and generating a media element to be displayed. The media element may correspond to the search response data and be represented in a format consistent with a predefined format.

At block 1540, the communication apparatus displays results within the keyboard region of the display 400. The results may be displayed within the search applet region 426 of the display 400 in a predetermined manner or in a manner defined by the queried server or servers. Where the search result media elements are search result applets, upon detection of user input located within a region of the display corresponding to the search result applet, the search result applet is executed and the response is displayed in the search applet region 426 of the display 400.

At block 1550, the process of determining an appropriate predetermined order for displaying the search result data may include defining a predetermined order as an order defined by a private search server 120, public search server 130*a*-130*n*, or by defining a set of conditions which, when applied to the search result data, orders the search result data in a predetermined order.

At block 1560, the communication apparatus sorts the received results. Sorting of the results based on the predetermined order may include comparing the search result media elements to the predetermined order defined by process 1550 and reorganizing the results in an order consistent with the predetermined order.

At block 1570, the communication apparatus determines whether the results from process 1560 are too large, e.g., there are more results than can be displayed on the display 400, and need to be truncated. This determination may include determining a total quantity of search result media elements within the search result data and comparing the quantity of search result media elements to a predefined threshold of search result media elements which can be displayed on the display 400.

At block 1580, the communication apparatus truncates the search results, if necessary. Truncating the search results may include, after ordering the search result media elements, discarding the search result media elements which are in excess of a predefined limit of media elements which can be displayed on the display 400.

Figure 16:
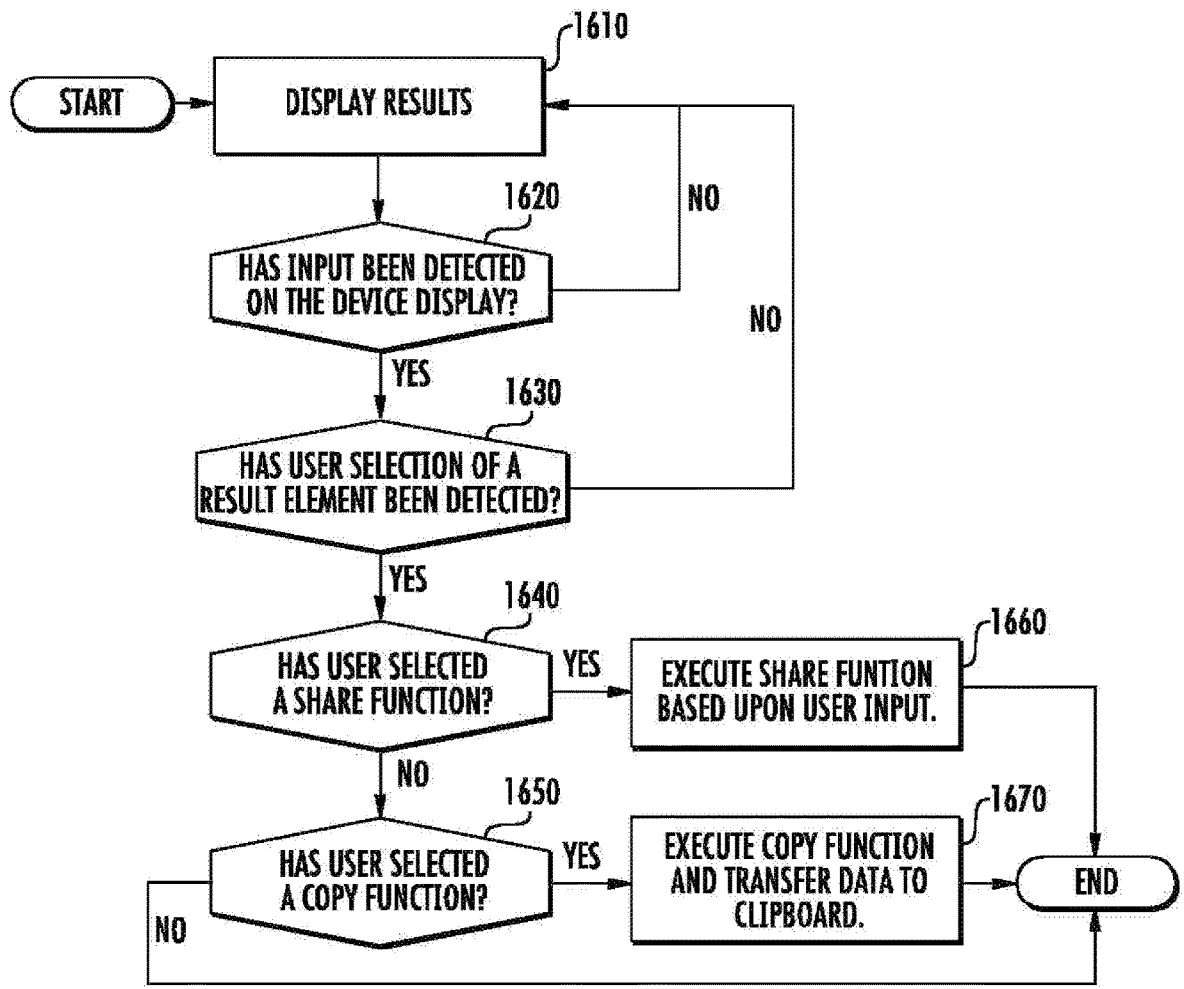
FIG. 16 is a flow diagram illustrating execution of a user's request to copy search media and transfer the search media to a messaging application for delivery to a recipient according to embodiments.

FIG. 16 is a flow diagram illustrating process 1600 for copying a search result media element and transmitting the search result media element to a second communication apparatus 110. In some embodiments, process 1600 may be performed by one or more components, communication apparatuses, or modules such as, but not limited to, communication apparatus 110.

At block 1610, the communication apparatus displays results on the display 400 within the keyboard region. Displaying results within the keyboard region of a communication apparatus display 400 may include displaying within the search applet region 426 of the display 400 the search result media elements in a predetermined manner or in a manner defined by the queried server or servers. Where the search result media elements are search result applets, upon detection of user input within the search result applet, the communication apparatus executes the search result applet and displays the response in the search applet region 426 of the display 400.

At block 1620, the communication apparatus determines whether input has been detected. This determination may include continuously detecting a display 400 for user input, and, if input is detected, executing determination 1630; otherwise, process 1610 is executed.

At block 1630, the communication apparatus determines whether a result element has been selected. The determination of whether a result element is selected can include determining whether input is detected on the screen in a location corresponding with the location of a displayed search result media element. Where the location of the user input corresponds with the location of the search result media element, the communication apparatus executes determination 1640; otherwise, the communication apparatus executes process 1610.

At block 1640, the communication apparatus determines whether a share function has been selected on the display. Determining whether a user has selected a share function may include determining whether a second input has been detected on the display 400, and, if so, determining whether the second input location corresponds with a share button displayed on the display 400 within the search applet region 426.

At block 1650, communication apparatus determines whether a copy function has been selected. Determining whether a copy function has been selected may include determining whether a second input has been detected on the display 400, and, if a second input has been detected, determining whether the second input location corresponds with a copy button displayed on the display 400.

It will become apparent to one skilled in the art that the process of determining whether a copy request or share request has been detected can be achieved by equivalent processes, and that process 1640 and process 1650 should not be seen as limiting.

At block 1660, the communication apparatus executes a share function. Execution of a share function based upon user input may include requesting an application to receive the search result media element, and transmitting the search result media element to the application for subsequent transmission from the communication apparatus to at least a second communication apparatus based on received destination information including a second communication apparatus address.

At block 1670, communication apparatus executes a copy function and transfers the copied data to a clipboard. The process of block 1670 may include identifying a search result media element to be transferred to a region in memory 202 which can be shared with multiple applications, and transferring the search result media element. The process of executing a copy function 1670 may further include overwriting the data stored in the region in memory shared with multiple applications or deleting the data stored in the region in memory prior to transmission of the search result media element.

The technology of the present disclosure provides novel systems, methods, and arrangements for the transmission and delivery of search queries from within a messaging application. Though detailed descriptions of one or more embodiments of the disclosed technology have been detailed above, various alternatives, modifications, and equivalents will be apparent to those of ordinary skill in the art without varying or departing from the spirit of the invention. For example, while the embodiments described above refer to particular features, components, or combinations thereof, such features components, and combinations may be substituted with functionally equivalent substitutes which may or may not contain the elements as originally described or arranged.

What is claimed is:

1. A method comprising:
    displaying, on a display, a messaging screen of a messaging application;
    detecting a request to execute a keyboard applet within keyboard applet memory space allocated within application memory space of the messaging application;
    in response to detecting the request to execute the keyboard applet, executing the keyboard applet within the keyboard applet memory space to display a keyboard screen on the display of a communication apparatus and display a search applet button;
    detecting selection of the search applet button;
    in response to detecting selection of the search applet button, executing a search applet, which displays a search input field configured to receive search input data;
    detecting selection of a search database from a plurality of search databases prior to receiving a series of characters, an image, or an audio file;
    receiving search input data entered into the search input field;
    performing a search of a server based on the search input data;
    receiving media content based on results of the search of the server;
    displaying, on the display, the media content within at least a portion of a keyboard region of the display;
    detecting contact on the display in the keyboard region as a selection of at least a portion of the displayed media content;
    detecting a request to forward the at least the portion of the displayed media content to another communication apparatus; and
    transmitting the at least the portion of the media content to another communication apparatus via the messaging application.

2. The method of claim 1, wherein the search input field is displayed adjacent to a message input field of the messaging application.

3. The method of claim 2, wherein the search input field is displayed between the message input field and the keyboard region.

4. The method of claim 1, wherein detecting the request to execute the keyboard applet includes detecting contact at a predetermined region of the messaging screen.

5. The method of claim 4, wherein the predetermined region of the messaging screen is a message input field of the messaging application.

6. The method of claim 1, wherein the search input data is a series of characters, an image, or an audio file.

7. The method of claim 1, wherein the media content is displayed in a predetermined order based on the search input data.

8. The method of claim 7, wherein a subset of the media content is output to the keyboard applet to be displayed on the display.

9. The method of claim 8, further comprising transferring the media content to a search result applet, the search result applet including an executable application configured to display the media content in a predetermined manner.

10. The method of claim 1, further comprising:
    displaying, in the keyboard region on the display, a share button;

detecting a request to share media content, the request including identifying the media content to be shared;
receiving destination information; and
transferring the media content to a destination address corresponding to the destination information.

11. The method of claim 1, wherein performing a search of a server based on the search input data includes:
detecting a first non-input data set, the first non-input data set including any combination of a communication apparatus location data, a communication apparatus state data, and a second search input data; and
identifying media content based on the first input data and the first non-input data.

12. A non-transitory computer-readable storage medium storing one or more programs, the one or more programs comprising instructions, which when executed by a processor of an electronic communication apparatus having a display, cause the electronic communication apparatus to:
display, on the display, a messaging screen of a messaging application;
detect a request to execute a keyboard applet within keyboard applet memory space allocated within application memory space of the messaging application;
in response to detecting the request to execute the keyboard applet, executing the keyboard applet within the keyboard applet memory space to display a keyboard screen on the display of a communication apparatus and display a search applet button;
detect selection of the search applet button;
in response to detecting selection of the search applet button, execute a search applet, which displays a search input field configured to receive search input data;
detect selection of a search database from a plurality of search databases prior to receiving a series of characters, an image, or an audio file;
receive search input data entered into the search input field;
perform a search of a server based on the search input data;
receive media content based on results of the search of the server;
display, on the display, the media content within at least a portion of a keyboard region of the display;
detect contact on the display in the keyboard region as a selection of at least a portion of the displayed media content;
detect a request to forward the at least the portion of the displayed media content to another communication apparatus; and
transmit the at least the portion of the media content to another communication apparatus via the messaging application.

13. The non-transitory computer-readable storage medium of claim 12, wherein the search input data includes text data from keyboard input, secondary search data, or the text data from the keyboard input and the secondary search data.

14. The non-transitory computer-readable storage medium of claim 13, wherein the secondary search data includes communication apparatus state data, location data, time data, system data, or any combination thereof.

15. The non-transitory computer-readable storage medium of claim 12, wherein the search input field is displayed adjacent to a message input field of the messaging application.

16. An electronic communication apparatus, comprising:
a display;
a processor coupled to the display; and
a memory coupled to the processor, the memory having stored thereon instructions which, when executed by the processor, cause the processor to:
display, on the display, a messaging screen of a messaging application, the messaging application configured to transmit and receive messages;
detect a request to execute a keyboard applet within keyboard applet memory space allocated within application memory space of the messaging application, the keyboard applet configured to receive keyboard input from the display;
executing the keyboard applet within the keyboard applet memory space to display the keyboard applet on the display in response to detecting the request to execute the keyboard applet, the keyboard applet including a search applet button;
detect selection of the search applet button;
detect selection of a search database from a plurality of search databases prior to receiving a series of characters, an image, or an audio file;
receive search input data;
perform a search of a server based on the search input data;
generate media content based on the search input data;
display, on the display, the media content within the keyboard applet;
detect contact on the display in a keyboard region as a selection of at least a portion of the displayed media content;
detect a request to forward the at least the portion of the displayed media content to another communication apparatus; and
transmit the at least the portion of the media content to another communication apparatus via the messaging application.

17. The electronic communication apparatus of claim 16, wherein the search input data includes text data from the keyboard input, secondary search data, or the text data from the keyboard input and the secondary search data.

18. The electronic communication apparatus of claim 17, wherein the secondary search data includes communication apparatus state data, location data, time data, system data, or any combination thereof.

* * * * *